US009684878B2

(12) United States Patent
Bogusky et al.

(10) Patent No.: US 9,684,878 B2
(45) Date of Patent: Jun. 20, 2017

(54) AUTOMATIC GRAPHICAL RENDERING OF PROCESSES

(75) Inventors: James M. Bogusky, Poughkeepsie, NY (US); Mary Ann Emmett, Poughkeepsie, NY (US); Donald A. Hallock, Poughkeepsie, NY (US); Arden Steuart Lake, Poughkeepsie, NY (US); Joseph Paul Palmeri, Poughkeepsie, NY (US); James I. Paradies, Poughkeepsie, NY (US); William Madison Sipperley, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1495 days.

(21) Appl. No.: 13/419,705

(22) Filed: Mar. 14, 2012

(65) Prior Publication Data

US 2012/0198382 A1    Aug. 2, 2012

Related U.S. Application Data

(63) Continuation of application No. 13/017,223, filed on Jan. 31, 2011.

(51) Int. Cl.
*G06Q 10/06* (2012.01)
*G06Q 50/04* (2012.01)
(Continued)

(52) U.S. Cl.
CPC ............ *G06Q 10/06* (2013.01); *G06Q 50/04* (2013.01); *G05B 19/0426* (2013.01);
(Continued)

(58) Field of Classification Search
CPC .... G06Q 50/04; G06Q 10/06; G06F 11/3664; G06F 2217/04
See application file for complete search history.

(56) References Cited

U.S. PATENT DOCUMENTS 4,914,568 A * 4/1990 Kodosky .......... G01R 31/31912
703/2
6,115,646 A    9/2000 Fiszman et al.
(Continued)

OTHER PUBLICATIONS

Bing search q=diagram%20subprocess%20subtask%20s Dec. 1, 2015.*
(Continued)

*Primary Examiner* — Jeffrey A Gaffin
*Assistant Examiner* — John M Heffington
(74) *Attorney, Agent, or Firm* — Lieberman & Brandsdorfer, LLC

(57) ABSTRACT

This disclosure relates to tools for optimizing complex processes or systems, such as flow process charts and, more specifically to the automatic graphical renderings of processes. In an exemplary embodiment, the process is a complex process including hundreds or thousands of operations. In an exemplary embodiment, a device displays a first view that includes a complete progression diagram automatically generated from data stored in a database, and at least some directional lines of the complete progression diagram unintelligibly overlap. In response to a selection of a particular operation in the complete progression diagram, in an exemplary embodiment, the display toggles to a second view that includes a focus diagram. In an exemplary embodiment, an edit to the focus diagram is checked in real-time and rejected if the edit orphans of an object currently undergoing the process on a live production line.

20 Claims, 25 Drawing Sheets

(51) Int. Cl.
*G06K 9/62* (2006.01)
*G06F 9/44* (2006.01)
*G05B 19/042* (2006.01)
*G06K 9/00* (2006.01)
*G06F 11/36* (2006.01)

(52) U.S. Cl.
CPC ...... *G05B 2219/23258* (2013.01); *G06F 8/34* (2013.01); *G06F 8/75* (2013.01); *G06F 11/3664* (2013.01); *G06F 2217/04* (2013.01); *G06K 9/00355* (2013.01); *G06K 9/6253* (2013.01); *Y02P 90/30* (2015.11)

(56) References Cited

U.S. PATENT DOCUMENTS

| | | | | |
|---|---|---|---|---|
| 6,225,998 | B1* | 5/2001 | Okita | G06F 8/34 707/999.102 |
| 7,428,495 | B2 | 9/2008 | Dhar et al. | |
| 7,685,527 | B2* | 3/2010 | Yan | G06Q 10/06 715/762 |
| 2001/0020291 | A1* | 9/2001 | Kudukoli | G06F 8/34 717/100 |
| 2001/0037177 | A1* | 11/2001 | Nishida | G01C 21/3638 701/438 |
| 2002/0089527 | A1* | 7/2002 | Paradies | G06Q 10/06 715/700 |
| 2003/0101021 | A1* | 5/2003 | Shah | G06F 9/44505 702/186 |
| 2003/0159128 | A1 | 8/2003 | Kunzler | |
| 2007/0005554 | A1* | 1/2007 | Daviau | G06F 17/30876 |
| 2008/0019378 | A1* | 1/2008 | Hogan | G06F 11/3664 370/400 |
| 2009/0031256 | A1* | 1/2009 | El-Nakhily | G06F 3/0482 715/854 |
| 2009/0070749 | A1 | 3/2009 | Solimano | |
| 2009/0199113 | A1 | 8/2009 | McWhinnie et al. | |
| 2010/0058292 | A1 | 3/2010 | Nattinger | |

OTHER PUBLICATIONS

Bing search q=diagram+crossing+connections&src=1 Dec. 1, 2015.*
Ben B. Graham, "Detail Process Charting: Speaking the Language of Process", Chapter 1, Introduction, Publisher: John Wiley & Sons, Inc., 2004, pp. 1-7.
Ben B. Graham, "Detail Process Charting, Speaking the Language of Process", The Ben Graham Corporation, 2003.
Robert A. Freitas, Jr. and William P. Gilbreath (editors), "Advanced Automation for Space Missions", NASA Conference Publication 2255, Proc. of the 1980 NASA/ASEE Summer Study held at the Univ. of Santa Clara, Santa Clara, California, Jun. 23-Aug. 29, 1980, Published Nov. 1, 1982. 14 pages.
"IBM Data Processing Techniques, Flowcharting Techniques", International Business Machines Corporation, Technical Publications Department, Document GC20-8152-1, Mar. 1970. 40 pages.
Ned Chapin, "Flowcharting With the ANSI Standard: A Tutorial", Computing Surveys, vol. 2, No. 2, Jun. 1970, pp. 119-146.
"Flowcharting, Mastering the Details", downloaded from the website: http://www.hci.com.au/hcisite2/toolkit/flowchar.htm, Dec. 16, 2010, 5 pages.

* cited by examiner

ISO 5807 symbols
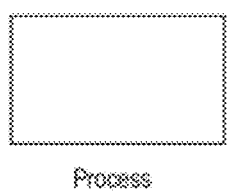
Process
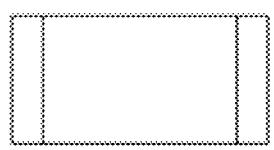
Predefined Process
Manual Operation
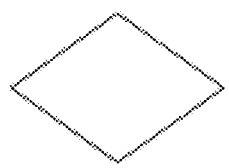
Decision
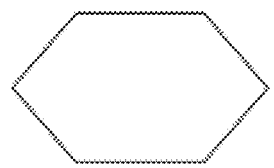
Preparation
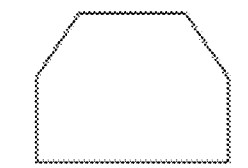
Loop Limit
Data
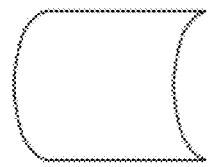
Stored Data
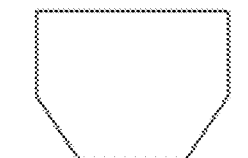
Loop Limit
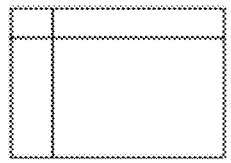
Internal Storage
Manual Input
Card
FIG. 1
(Prior Art)

IBM ®

FLOWCHARTING TEMPLATE

FORM X20-8020

The symbols shown on this envelope are recommended for use in the preparation of system and program flowcharts. A detailed description for FLOWCHARTING TECHNIQUES can be found in the IBM Data Processing Techniques manual by that name (C20-8152).

| PROGRAM FLOWCHART SYMBOLS | |
|---|---|
| SYMBOL | REPRESENTS |
| ▭ | PROCESSING: A group of program instructions which perform a processing function of the program. |
| ⏢ | INPUT/OUTPUT: Any function of an input/output device (making information available for processing, recording processing information, tape positioning, etc.). |
| ◇ | DECISION: The decision function used to document points in the program where a branch to alternate paths is possible based upon variable conditions. |
| ⬠ | PROGRAM MODIFICATION: An instruction or group of instructions which changes the program. |
| ⬡ | PREDEFINED PROCESS: A group of operations not detailed in the particular set of flowcharts. |
| ▢ | TERMINAL: The beginning, end, or a point of interruption in a program. |
| ○ | CONNECTOR: An entry from, or an exit to, another part of the program flowchart. |
| ⌂ | OFFPAGE CONNECTOR: A connector used instead of the connector symbol to designate entry to or exit from a page. |
| ◁ ▷ ▽ △ | FLOW DIRECTION: The direction of processing or data flow. |

| SUPPLEMENTARY SYMBOL FOR SYSTEM AND PROGRAM FLOWCHARTS | |
|---|---|
| ▭ | ANNOTATION: The addition of descriptive comments or explanatory notes as clarification. |

FIG. 2
(Prior Art)

| Category: AODA 1.0 (4452ae31) Distinct Ops (13) Wip:0)   (Edit) |||||||
|---|---|---|---|---|---|---|
| Key: |||||||
| Ppo_id | | | | Generic Op | Path | Next_ppo_id | Generic Op |
| 01_BRD_INGATE | D | | | BRD_INGATE | C  OK | 11_PIN_IN_HOLE | PIH_INSERT |
| 11_PIN_IN_HOLE | | | | PIH_INSERT | CR OK | 12_PRE_SOLD_INSP | PRE_SOLDER_IN |
| 12_PRE_SOLD_INSP | | | | PRE_SOLDER_IN |    OK | 13_SOLDER_DIWASH | SOLDER_DIWASH |
| 13_SOLDER_DIWASH | | | | SOLDER_DIWASH | CR OK | 14_XRAY | XRAY |
| 14_XRAY | | | | XRAY | CR OK | 15_BAKE | BAKE |
| 15_BAKE | | | | BAKE | CR OK | 20_INSPECT | INSPECT |
| 20_INSPECT | | | | INSPECT | CR OK | 60_PACK | PACK |
| | | | | | FOUNTAIN | 29_SOLDER_FOUNT | SLDR_FOUNTAIN |
| 29_SOLDER_FOUNT | | | | SLDR_FOUNTAIN |    OK | 14_XRAY | XRAY |
| 60_PACK | | | C | PACK | CR OK | 65_PC_STOCK | PC_STOCK |
| 90_ENDICOTT | | | | ENDICOTT |    OK | 90_MRB_SCRAP | MRB_SCRAP |

```
01_BRD_INGATE
  11_PIN_IN_HOLE
    12_PRE_SOLD_INSP
      13_SOLDER_DIWASH
        14_XRAY
          15_BAKE
            [20_INSPECT]
            -60_PACK
              ¯65_PC_STOCK
            ~-29_SOLDER_FOUNT
              *14_XRAY
```
                                        600

Provide a first view, the first view including a complete progression diagram automatically generated from data stored in a database, wherein the complete progression diagram includes directional lines linking nodes representing originating operations to nodes representing corresponding subsequent operations, wherein the directional lines represent the outcomes of the originating operations, and wherein at least some of the directional lines unintelligibly overlap.
1010

In response to a selection of a particular operation in the complete progression diagram, toggle to a second view, the second view automatically generated based on the user selection and including a focus diagram, wherein the focus diagram is a separate progression diagram including only those directional lines which represent outcomes of the particular operation, wherein said only those directional lines link nodes representing the particular operation to nodes representing only those corresponding subsequent operations directly based on said outcomes of the particular operation.
1020

FIG. 10

AUTOMATIC GRAPHICAL RENDERING OF PROCESSES

CROSS REFERENCE TO RELATED APPLICATION(S)

The present application is a continuation of U.S. patent application Ser. No. 13/017,223, filed on Jan. 31, 2011 and titled "Automatic Graphical Rendering of Processes" now pending, and is hereby incorporated by reference.

FIELD

The present disclosure relates to tools for optimizing complex processes or systems, such as flow process charts and, more specifically to the automatic graphical renderings of processes.

BACKGROUND

In the late nineteenth century and early twentieth century, Frank Gilbreth developed a collection of tools for studying work that later became one of the foundations of industrial engineering. Industrial engineering is a branch of engineering dealing with the optimization of complex processes or systems. One of the tools developed by Gilbreth was his flow process chart, which was a lined, columnar form with sets of five symbols running down the page and a space adjacent to each set of symbols for a brief description. In 1947, the American Society of Mechanical Engineers (ASME) established a set of symbols as the ASME Standard for Operation and Flow Process Charts. The first process charts appeared as a series of symbols strung down a page in sequential order. Most flow process charts today are still constructed using a set of standard symbols, e.g., those set forth in American National Standards Institute (ANSI) X3.6-1970 or International Organization for Standardization (ISO) 5807. FIG. 1 is a drawing of some ISO standard flow process chart symbols.

BRIEF SUMMARY

Embodiments of this disclosure provide in a graphical user interface, a method for rendering on a display device operations of a process and routes between the operations, the method including providing a first view, the first view including a complete progression diagram automatically generated from data stored in a database, wherein the complete progression diagram includes directional lines linking nodes representing originating operations to nodes representing corresponding subsequent operations, wherein the directional lines represent the outcomes of the originating operations, and wherein at least some of the directional lines unintelligibly overlap; and in response to a user selection of a particular operation in the complete progression diagram, toggling to a second view, the second view automatically generated based on the user selection and including a focus diagram, wherein the focus diagram is a separate progression diagram including only those directional lines which represent outcomes of the particular operation, wherein the only those directional lines link nodes representing the particular operation to nodes representing only those corresponding subsequent operations directly based on the outcomes of the particular operation. The method may also include providing a line deletion tool, the line deletion tool controllable by a user to delete a directional line between two nodes shown in the focus diagram, the two nodes representing two different operations. The method may also include in response to deleting of the directional line between the two nodes, automatically checking stored rules associated with the two operations to determine if terminating a relationship between the two operations is permissible under the rules. The process may relate to a live manufacturing production line. Automatically checking stored rules associated with the two operations to determine if terminating the relationship between the two operations is permissible under the rules may include checking a production line object tracking system for existence of a physical object undergoing either of the two operations to determine whether deleting of the directional line orphans the physical object on the live manufacturing production line. The method may further include in response to the checking, if deleting of the directional line orphans the physical object on the live production line, rejecting the deleting of the directional line.

Embodiments of this disclosure also provide a method for displaying operations of a process, the method including accessing an operations table, wherein the operations table including a first column identifying originating operations, a second column identifying outcomes of the originating operations, and a third column identifying subsequent operations based on the outcomes; converting, via an automated process, the operations table into a complete progression diagram, wherein the complete progression diagram depicts progressive routes through the operations by placing nodes representing later operations visually shifted in a consistent direction away from nodes representing earlier operations, and wherein the complete progression diagram depicts paths between the operations using directional lines connecting nodes representing originating operations to nodes representing corresponding subsequent operations, the directional lines representing the outcomes of the operating operations; transmitting the complete progression diagram to a display device for display, wherein dimensions of the complete progression diagram relative to dimensions of the display device are such that at least some of the directional lines unintelligibly overlap; and in response to a user selecting an operation depicted in the complete progression diagram, causing the display device to display a focus diagram, wherein the focus diagram is a separate progression diagram depicting the selected operation, only those routes connecting the selected operation to immediate subsequent operations; and only those immediate subsequent operations. Each node may have the same geometric shape.

BRIEF DESCRIPTION OF THE DRAWINGS

Embodiments of the disclosure are described by way of example with reference to the accompanying drawings wherein FIG. 1 is a drawing of some of ISO standard flow process chart symbols;

FIG. 5 is an illustration of an operations table;

FIG. 6 is an illustration of an ordered sequence diagrammatic representation;

FIG. 10 is an illustration of a method in accordance with embodiments of this disclosure;

Figure 2:
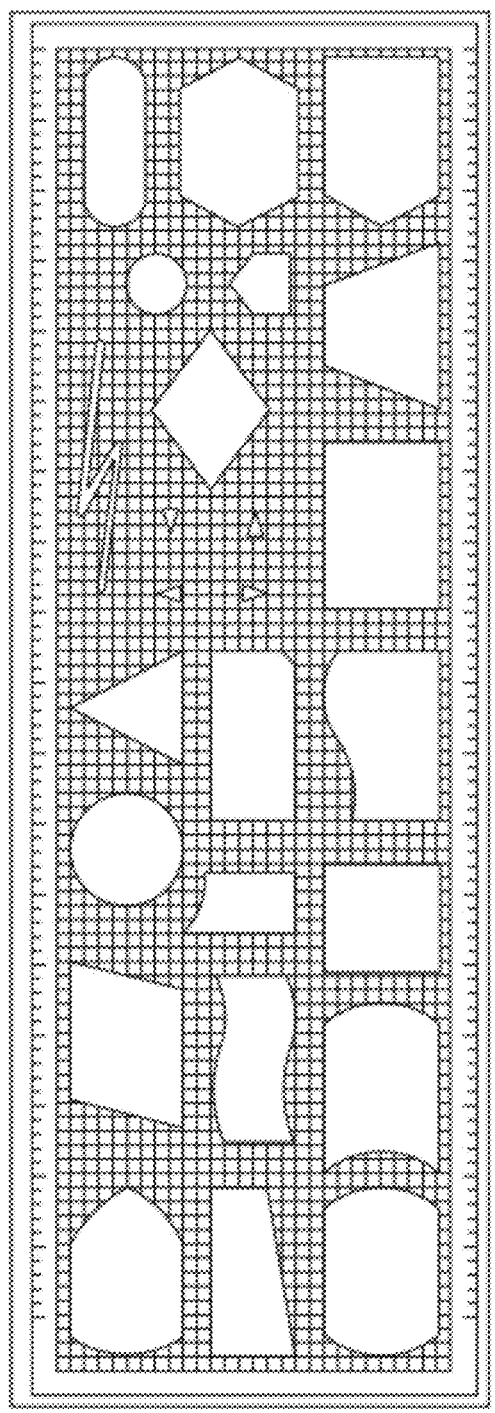
FIG. 2 is an image of an IBM Flowcharting Template Form X20-8020.

It is noted that the drawings of the disclosure are not to scale. The drawings are intended to depict only typical aspects of the disclosure, and therefore should not be considered as limiting the scope of the disclosure. In the drawings, like-numbering represents like-elements when comparing between drawings.

DETAILED DESCRIPTION

A flow process chart is a tool for analyzing processes. Flow process charts generally provide a more detailed understanding of a process than block diagrams. Flow process charts can be used for many purposes. For example, flow process charts may be used to identify problems; assist in the development of new processes; compare and standardize similar processes; help to fix problems with an object of the process; help to fix problems with the process itself; and/or train/educate managers, workers, new employees, and/or auditors about the process; etc.

Figure 3:
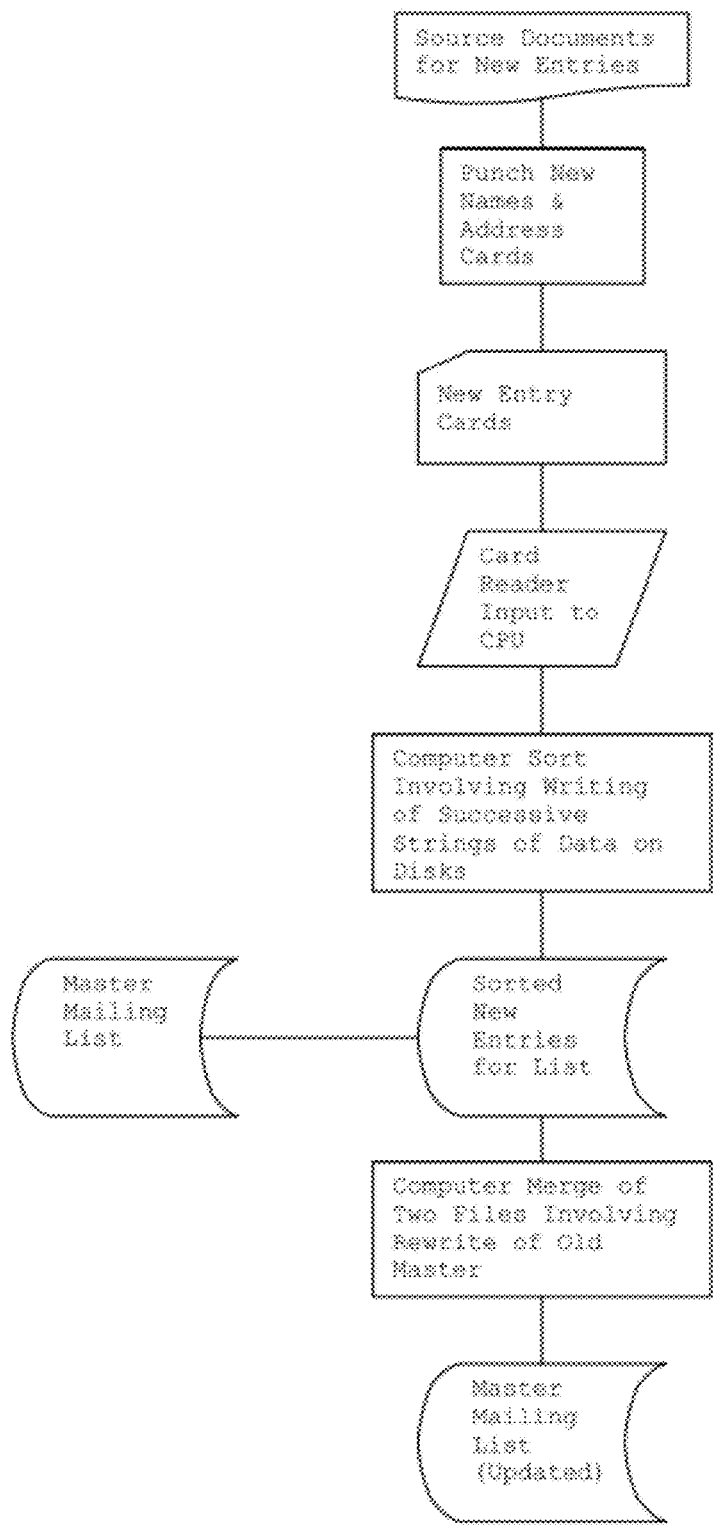
FIG. 3 is an illustration of an ANSI/ISO flow process chart manually drawn using software that makes available template ANSI or ISO flow process chart symbols.

Simple processes may be charted manually on paper, e.g., using the IBM flowcharting template shown in FIG. 2, or manually using diagramming software that make available template ANSI or ISO flow process chart symbols, e.g., Microsoft® Visio®. As used herein, a flow process chart that generally follows the ANSI or ISO flow process chart standards and uses the ANSI or ISO flow process chart symbols is referred to as an ANSI/ISO flow process chart. FIG. 3 is an illustration of an ANSI/ISO flow process chart manually created using software that makes available template ANSI or ISO flow process chart symbols.

Figure 4:
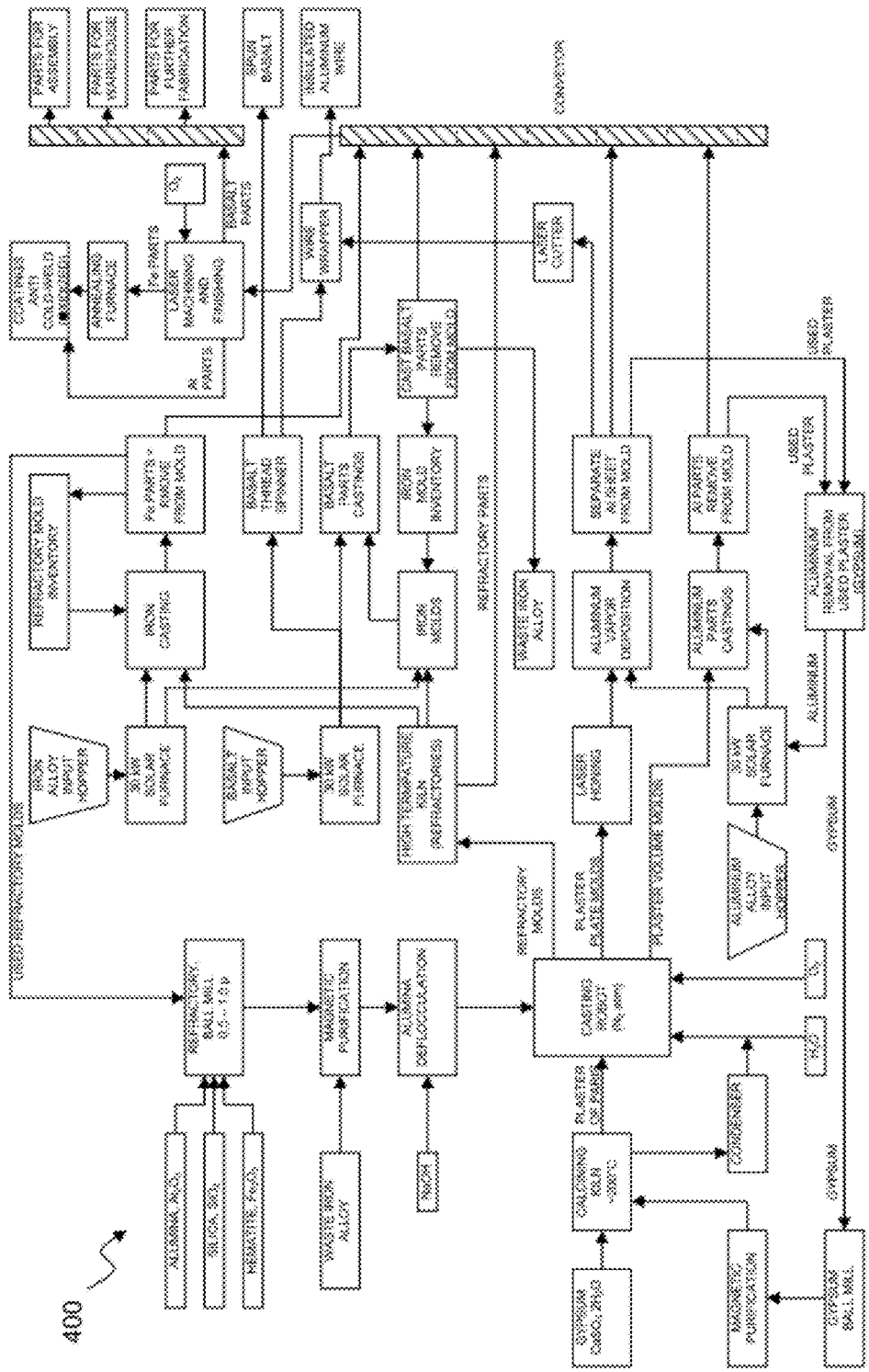
FIG. 4 is an illustration of an ANSI/ISO flow process chart of a process that is more complex than the process shown in FIG. 3.

For complex processes, manually creating a flow process chart, even with the aid of such software, is time-consuming and challenging. FIG. 4 is an illustration of an ANSI/ISO flow process chart of a process that is more complex than the process shown in FIG. 3. FIG. 4 shows a flow process chart 400 for parts fabrication related to a Lunar Manufacturing Facility, as seen in "*Advanced Automation for Space Missions*," Proceedings of the 1980 NASA/ASEE Summer Study, NASA Conference Publication 2255. As stated in the publication, the chart 400 is a basic operational flowchart. One can imagine that a more detailed operational flowchart for such a facility may include hundreds or thousands of operations.

Manually creating a detailed flow process chart for a complex process, even using diagramming software, can be impractical and in some cases unfeasible. Even if one spent the time and energy to create such a chart manually, the operations of the process may be related in such an intricate fashion that some lines inevitably overlap such that the chart becomes unintelligible. The chart may begin to look like spaghetti, as some call it. Accordingly, a detailed operational flowchart showing the possibly dozens, hundreds, or thousands of interrelated operations that may be part of the actual process, only basically depicted in FIG. 4, may be difficult to read and/or impractical to use. It may become unreasonable to expect someone other than the chart creator to understand the chart. Yet management of a complex process often calls for detailed knowledge of the process' operations and routes.

To support the analysis and management of complex processes, embodiments of this disclosure provide a method for rendering operations of a process and routes between those operations. In an exemplary embodiment, the rendering is in a graphical user interface (GUI) on a display device.

In certain embodiments, operations of a process are stored as data in a database, e.g., a relational database, such as an IBM® DB2® database. The process may have been stored in a database, for example, because the process is sufficiently complex that storing the process as an ANSI/ISO flow process chart is impractical and/or less useful. The complexity may be due to the complexity of the routes, the number of operations, and/or the number of decisions occurring in the process, for example. Storing operations of a process as data in a database allows the process to be viewed as a table, e.g., by querying the database.

FIG. 5 is an illustration of an operations table 500. An operations table is a table that identifies originating operations, outcomes of those originating operations, and subsequent operations based on the outcomes. When an originating operation has more than one possible outcome, more than one row is used so that there is one row for each possible outcome and its corresponding subsequent operation. In FIG. 5, the operations table 500 includes a column 510 identifying originating operations, a column 520 identifying outcomes of the originating operations, and a column 530 identifying subsequent operations based on the outcomes shown in column 520.

In the operation table 500, outcomes of the originating operations shown include OK and FOUNTAIN. In this example, FOUNTAIN is a label for a particular outcome and may provide additional information to a user. Here, when the outcome of the inspection is FOUNTAIN (rather than OK), the subsequent operation is a fountain type of operation. In this instance, the fountain type of operation is a solder fountain operation. Embodiments of this disclosure are applicable to processes that have operations having any number of possible outcomes (such as two possible outcomes (e.g., OK and NOT OK, or YES and NO, or OK and FOUNTAIN) or more than two possible outcomes (e.g., OK, FOUNTAIN, and NOT OK)). In FIG. 5, an originating operation, e.g., 20_INSPECT, has two possible outcomes and uses two rows, but the text 20_INSPECT is not repeated in the second row. In other embodiments, the text, e.g., 20_INSPECT, is repeated in the second row so that each row has text in each column 510, 520, and 530.

An operation may also include columns other than those discussed above. For example, table 500 also includes additional columns, labeled 540, which identify keys that help one understand relationships each originating operation has with information outside of the routing between operations. For example, keys "I", "D", and "C" are shown in certain operations' row in the table. In this example, "I" indicates that the operation has a relationship with inventory links, which are associated with a parts management system; "D" indicates that the operation has a relationship with defects flags, which are associated with a defect control system; and "C" indicates that there are certifications that are held or must be held by employees related to that operation.

Viewing an operations table, such as the one shown in FIG. 5, is useful for many purposes, e.g., to gain a general overview of the total number of operations, to have a central location that identifies every possible operation of the process, and/or to have a central location to consolidate knowledge acquired by different individuals of the different aspects of the process.

Other analysis of a process may be supported by a different view. One such view is an ordered sequence diagrammatic representation. An ordered sequence diagrammatic representation is a text representation of a process. The text representation resembles a diagram, but is operationally a text file. In an ordered sequence diagrammatic representation, the order of the operations is conveyed by placing the text representing a next operation indented and on a different row (e.g., by inserting a line break and a tab).

FIG. 6 is an illustration of an ordered sequence diagrammatic representation 600. The ordered sequence diagrammatic representation 600 is automatically generated based on the data which is also displayed in the operations table 500. By viewing the operations table 500, it may take some time to understand that an object undergoing that manufacturing process may undergo 14_XRAY twice. By viewing representation 600, it is more readily understood that an object may undergo 14_XRAY twice, and the reason is because the object may repeat 14_XRAY if, after the 20_INSPECT operation, the object is routed to 29_SOLDER_FOUNT rather than to 60_PACK. In FIG. 6, brackets are used to highlight that 20_INSPECT is a decision point and an asterisk is used to highlight that the second 14_XRAY is a repeat operation. In some embodiments, color is additionally or alternatively used to highlight decision points and repeats.

Because the ordered sequence diagrammatic representation 600 is operationally a text file, it is used to convey a view rather than as an interactive tool. Accordingly, in practice, to edit the representation, e.g., to remove the route from 29_SOLDER_FOUNT to 14_XRAY and connect 29_SOLDER_FOUNT to 90_ENDICOTT, a user does not edit the representation 600 directly. Instead, the user alters in the corresponding operations table, e.g., table 500, and has the ordered sequence diagrammatic representation regenerated with the new route. In addition, the user may not have known that the 90_ENDICOTT operation was available for the process. This is because the 90_ENDICOTT operation was not linked to any other operation in the representation 600 and therefore was not shown in the representation 600.

The user would have had to determine that the 90_ENDICOTT operation was available based on a different source, e.g., by viewing table 500.

Figure 7:
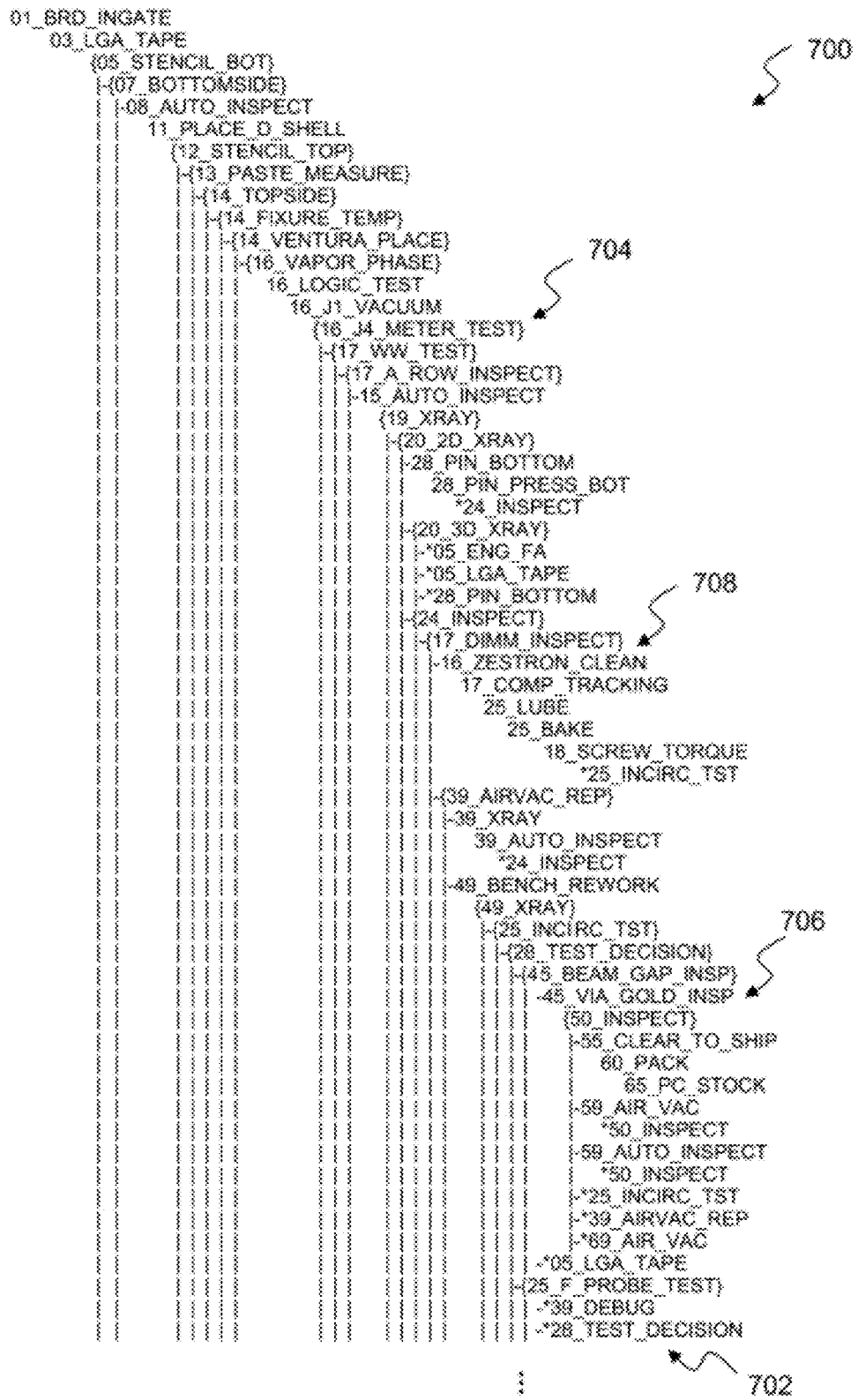
FIG. 7 is an illustration of another ordered sequence diagrammatic representation.

FIG. 7 is an illustration of another ordered sequence diagrammatic representation. The representation 700 depicts a more complex process than that shown in representation 600. In this example, the complexity of the process is such that only a subset of the representation is shown on a display device to avoid making the text too small to read. Since only a subset of the representation is shown, it may also take some time (and scrolling) for a person to understand that 28_TEST_DECISION (labeled 702 in FIG. 7) may immediately follow 16_J4_METER_TEST (labeled 704).

It may also take some time for a person analyzing the representation 700 to understand that six operations after 46_VIA_GOLD_INSP (labeled 706), an object may undergo 17_DIMM_INSPECT (labeled 708). For example, an object undergoing the 46_VIA_GOLD_INSP operation may route to 50_INSPECT, then back 39_AIRVAC_REP. From there, it may route to 39_XRAY, then to 39_AUTO_INSPECT, then back to 24_INSPECT. From 24_INSPECT, it may then route to 17_DIMM_INSPECT. Other routing consistent with the process can also exist which may not be easily understood if only a subset of the ordered sequence diagrammatic representation is shown on a display device at one time, e.g., due to the dimensions of the representation compared to the dimensions of the display device. For some processes, shrinking the text to try to display the entire process on the display device may make the text too small to read and therefore not be a desirable way to analyze certain processes.

One view that shows sequentially close operations that are otherwise visually far apart in an ordered sequence diagrammatic representation is a nested process tree diagram. A nested tree diagram resembles a tree structure used in a file directory except that, in a nested tree diagram, operations that appear in more than one location in the tree are not two different operations; they are one operation shown in two locations. This may be better understood with reference to FIG. 8.

Figure 8:
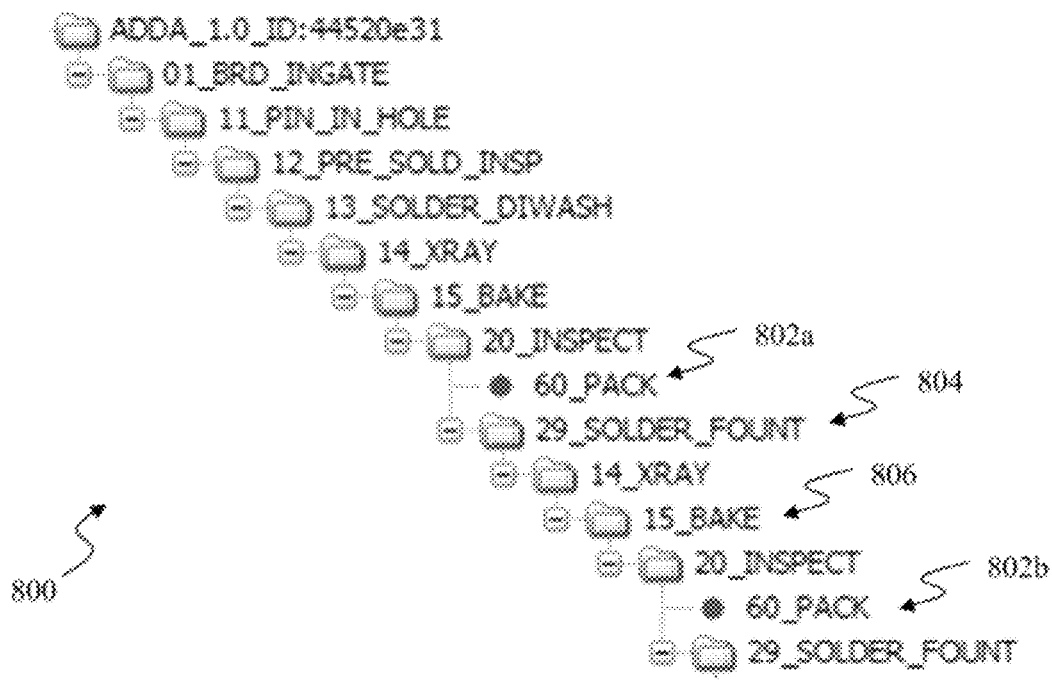
FIG. 8 is an illustration of a nested process tree diagram of the same process represented in FIGS. 5 and 6.

FIG. 8 is an illustration of a nested process tree diagram 800 of the same process represented in FIGS. 5 and 6. In a file directory tree, a file with one name located in one folder and a file with the same name located in another folder are two different files. Accordingly, changing the first file does not change the second file. In contrast, in the nested process tree diagram 800, the operation 60_PACK (labeled 802a) and the operation 60_PACK (labeled 802b) are the same operation. Changing a route to or from the operation 60_PACK (labeled 802a) also changes it for the operation 60_PACK (labeled 802b), because they are the same operation shown in two different locations to show a route within the process. By viewing the operations of table 500 as a nested process tree, it may be more readily understandable that two operations after 29_SOLDER_FOUNT (labeled 804), a bake operation 15_BAKE (labeled 806) occurs.

In a nested process tree diagram, operations having subsequent operations can be collapsed to aid in understanding the route of a particular object in the process. However, in some cases, unless a limit is placed on the number of times an object can undergo an operation, a system or device that automatically generates a nested process tree, such as tree 800, from an operations table, such as table 500, may run into an infinite loop error. For example, if a limit is not placed on the number of times an object can undergo 29_SOLDER_FOUNT, a device that automatically generates the nested process tree 800 may attempt to continue creating a nested 29_SOLDER_FOUNT and a nested 14_XRAY until a memory error occurs.

Embodiments of this disclosure provide a tool to analyze complex processes. An exemplary circumstance in which complex processes exist is in the manufacturing of a product. Accordingly, in examples disclosed herein, manufacturing processes are described in order to explain principles of the disclosure and its application in practice. However, aspects of this disclosure are also applicable to processes unrelated to manufacturing.

As the complexity of processes (e.g., manufacturing processes) increases, an increased ability to analyze and understand the process, and possibly share and transfer that knowledge to other individuals, becomes more and more important. For example, more individuals tend to be involved in performing operations of a complex process and in managing that process. An increased ability to analyze and understand a complex process, and share and transfer that knowledge to other individuals, can also aid in making real-time changes (e.g., to a live production line), which may provide a competitive advantage.

Figure 9:
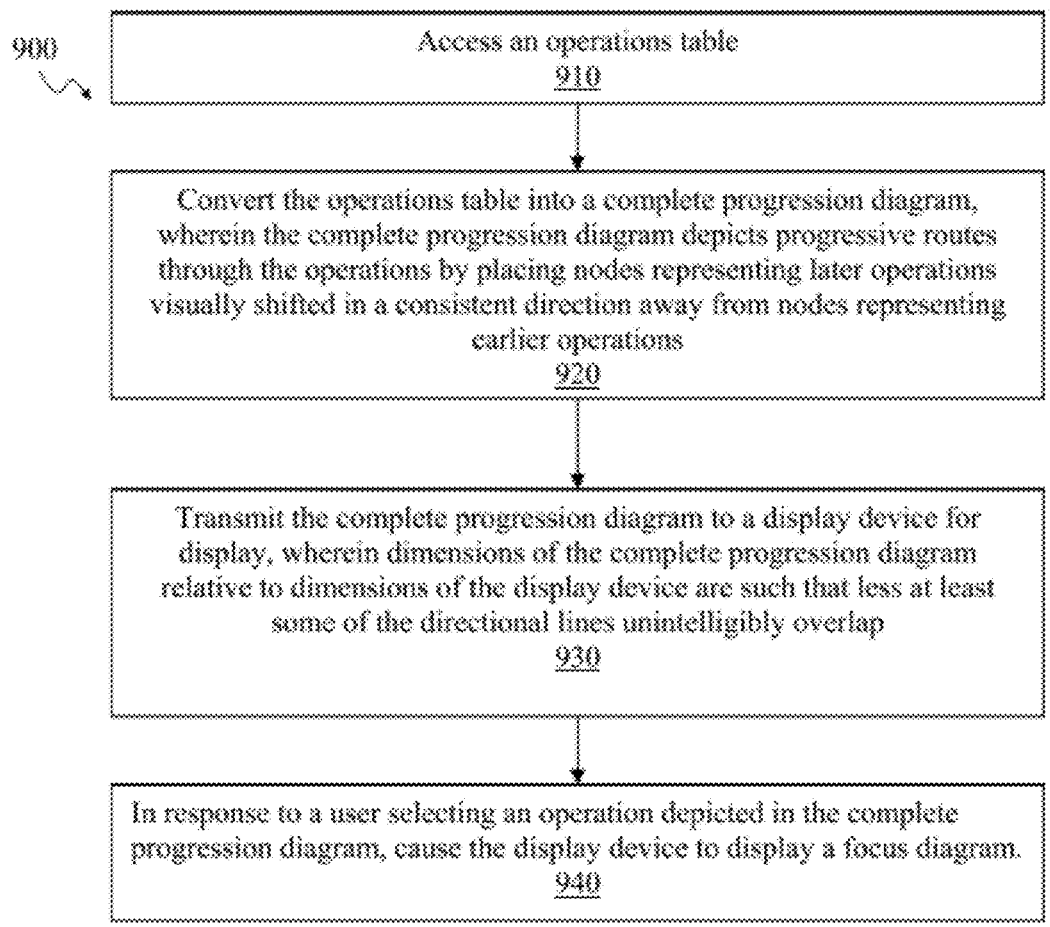
FIG. 9 is an illustration of a method in accordance with embodiments of this disclosure.

FIG. 9 is an illustration of a method 900 in accordance with embodiments of this disclosure. FIG. 10 is also an illustration of a method 1000 in accordance with embodiments of this disclosure. FIGS. 9 and 10 are first described below, but may be better understood with reference to the subsequent figures, which are described thereafter.

The method 900 is a method for displaying operations of a process. In an exemplary embodiment, the process is a complex process including hundreds or thousands of operations. At block 910, an operations table is accessed. The operations table includes a first column identifying originating operations, a second column identifying outcomes of the originating operations, and a third column identifying subsequent operations based on those outcomes. The operations table may be the operations table 500, for example. In one embodiment, the method includes accessing data stored in a database, e.g., a relational database; and generating the operations table from that data. In one embodiment, the table is a table of the database.

At block 920, the operations table is converted into a complete progression diagram. In an exemplary embodiment, the converting is via an automated process. This automated process may use some aspects of the system and method described in US Patent Publication 2002/0089527, for example. Other systems or methods to convert data from an operations table to a complete progression diagram may also be used and remain within the scope of embodiments of this disclosure. The complete progression diagram includes directional lines linking nodes that represent originating operations to nodes that represent corresponding subsequent operations. The directional lines represent the outcomes of the originating operations, and depict paths between the operations.

In an exemplary embodiment, at least some of the directional lines of the complete progression diagram unintelligibly overlap, e.g., due to intricate relationships between the operations. In an exemplary embodiment, the complete progression diagram depicts progressive routes through the operations by placing nodes representing later operations visually shifted in a consistent direction away from nodes representing earlier operations. In an exemplary embodiment, each node in the complete progression diagram has the same geometric shape. The geometric shape may be, for example, a rectangle (including a square), a rounded rectangle, a stadium, an octagon, a hexagon, a pentagon, etc.

At block 930, the complete progression diagram is transmitted to a display device for display. The transmission may be via the network 1925 shown in FIG. 19B, for example. The display device may be, for example, the display device 1800 or the display unit 50, both of which are described in more detail below. In an exemplary embodiment, the dimensions of the complete progression diagram relative to dimensions of the display device are such that at least some of the directional lines unintelligibly overlap. Block 930 may be better understood with reference to FIG. 11 and FIG. 12.

At block 940, in response to a user selecting an operation depicted in the complete progression diagram, a focus diagram is displayed. The focus diagram is a separate progression diagram from the complete progression diagram. The focus diagram includes only those directional lines that represent outcomes of the particular operation which was selected. The directional lines in the focus diagram link nodes representing the particular operation that was selected to nodes representing only those corresponding subsequent operations directly based on the outcome(s) of that particular operation. In exemplary embodiments, nodes representing operations that immediately precede the selected operation are not shown in the focus diagram. Block 940 may be better understood with reference to FIG. 13.

In one embodiment, the focus diagram is pre-generated and the method includes retrieving the focus diagram from a storage device. In an exemplary embodiment, the focus diagram is not pre-generated, but instead generated in response to the user selecting the operation. A client device containing or coupled to the display device causes the display device to display the focus diagram. In one embodiment, a server coupled to the client device provides the client device with the focus diagram to be displayed.

The method 1000 is a method for rendering on a display device operations of a process and routes between those operations. The display device may be, for example, the display device 1800 or the display unit 50, both of which are described in more detail below. In exemplary embodiments, the display device is part of or coupled to a client device. The client device may be, for example, device 1920, also described in more detail below. In an exemplary embodiment, the method 1000 is provided as part of a graphical user interface.

At block 1010, a first view is provided. The first view includes a complete progression diagram automatically generated from data stored in a database. The complete progression diagram includes directional lines linking nodes that represent originating operations to nodes that represent corresponding subsequent operations. The directional lines represent the outcomes of the originating operations. In this view, at least some of the directional lines unintelligibly overlap. Block 1010 may be better understood with reference to FIG. 11 and FIG. 12.

At block 1020, in response to a selection of a particular operation in the complete progression diagram, the method 1000 includes toggling to a second view. This toggling may be performed by a system such as that described with reference to FIG. 19A, for example. The second view includes a focus diagram. The focus diagram is a separate progression diagram from the complete progression diagram. In one embodiment, the focus diagram view is automatically generated in response to the user selection. In other embodiments, the focus diagram is pre-generated and the method includes retrieving the focus diagram from a storage device (e.g., the removable storage unit 60 or 62 shown in FIG. 21, for example). The focus diagram includes only those directional lines that represent outcomes of the particular operation which was selected. The directional lines in the focus diagram link nodes representing the particular operation which was selected to nodes representing only those corresponding subsequent operations directly based on the outcome(s) of the particular operation. In exemplary embodiments, nodes representing operations that immediately preceded the selected operation are not shown in the focus diagram. Block 1020 may be better understood with reference to FIG. 13.

Figure 11:
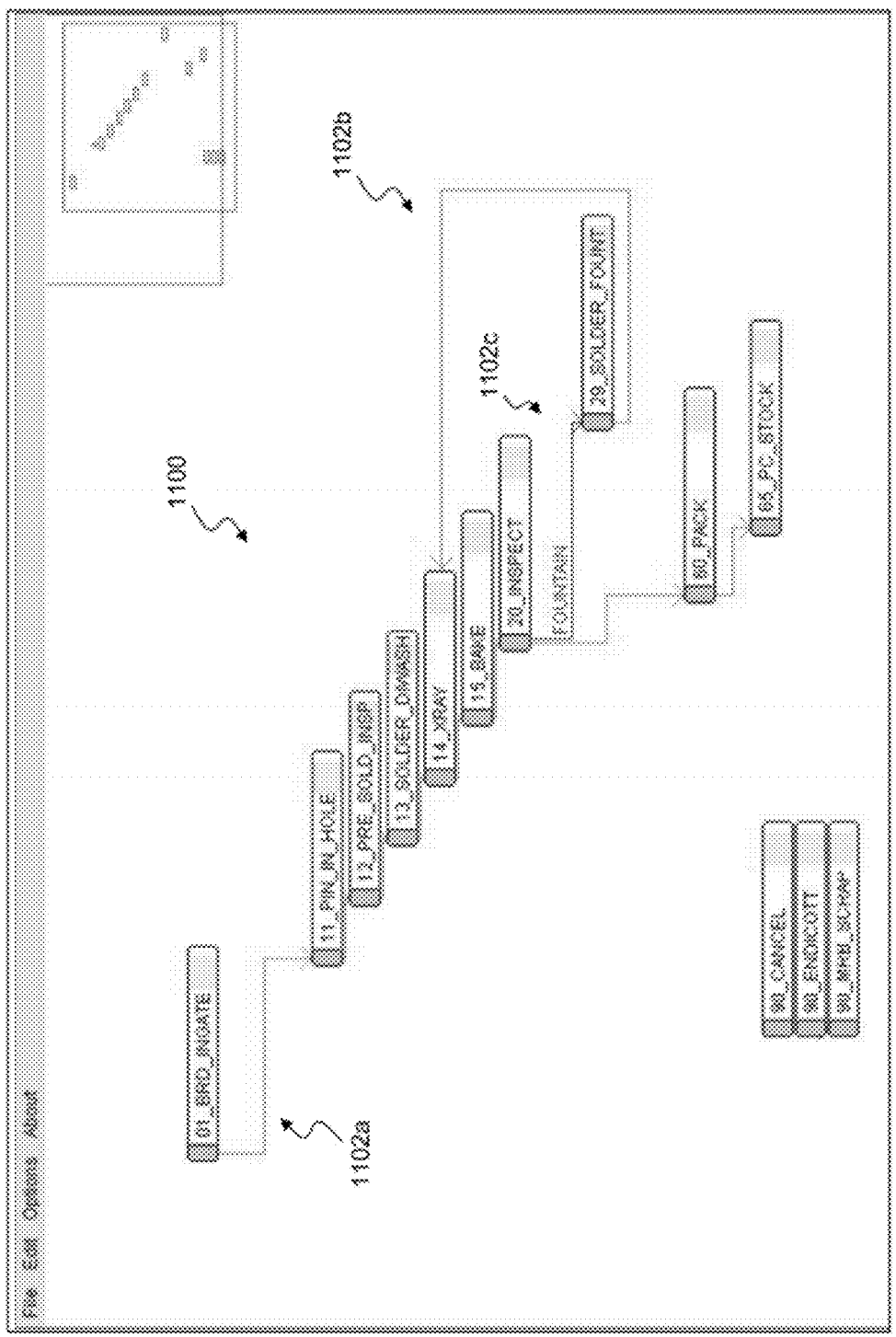
FIG. 11 is a complete progression diagram of a process in accordance with embodiments of this disclosure.

FIG. 11 is a complete progression diagram 1100 of a process in accordance with embodiments of this disclosure. The complete progression diagram 1100 is automatically generated from data stored in a database. In this specific case, the complete progression diagram 1100 is automatically generated from data in an IBM® DB2® database. The complete progression diagram 1100 includes directional lines, such as 1102a, 1102b, and 1102c, linking nodes representing originating operations to nodes representing corresponding subsequent operations. For example, directional line 1102a links a node representing an originating operation, 01_BRD_INGATE, to a node representing a corresponding subsequent operation, 11_PIN_IN_HOLE. As can be appreciated, a node representing a subsequent operation can also be an original operation for a different subsequent operation. For example, the node representing operation 11_PIN_IN_HOLE is a node that represents a subsequent operation to operation 01_BRD_INGATE and also an originating operation to 12_PRE_SOLD_INSP. In an exemplary embodiment, each node in the diagram 1100 represents an operation on a live production line. The directional lines represent the outcomes of originating operations. For example, the directional line 1102c represents the FOUNTAIN outcome of the originating operation 20_INSPECT (discussed above with reference to FIG. 5). The process shown in FIG. 11 is relatively simple in order to illustrate certain principles of this disclosure. However, it shall be understood that embodiments of this disclosure are applicable to more complex process. Such a process is shown in FIG. 12.

Figure 12:
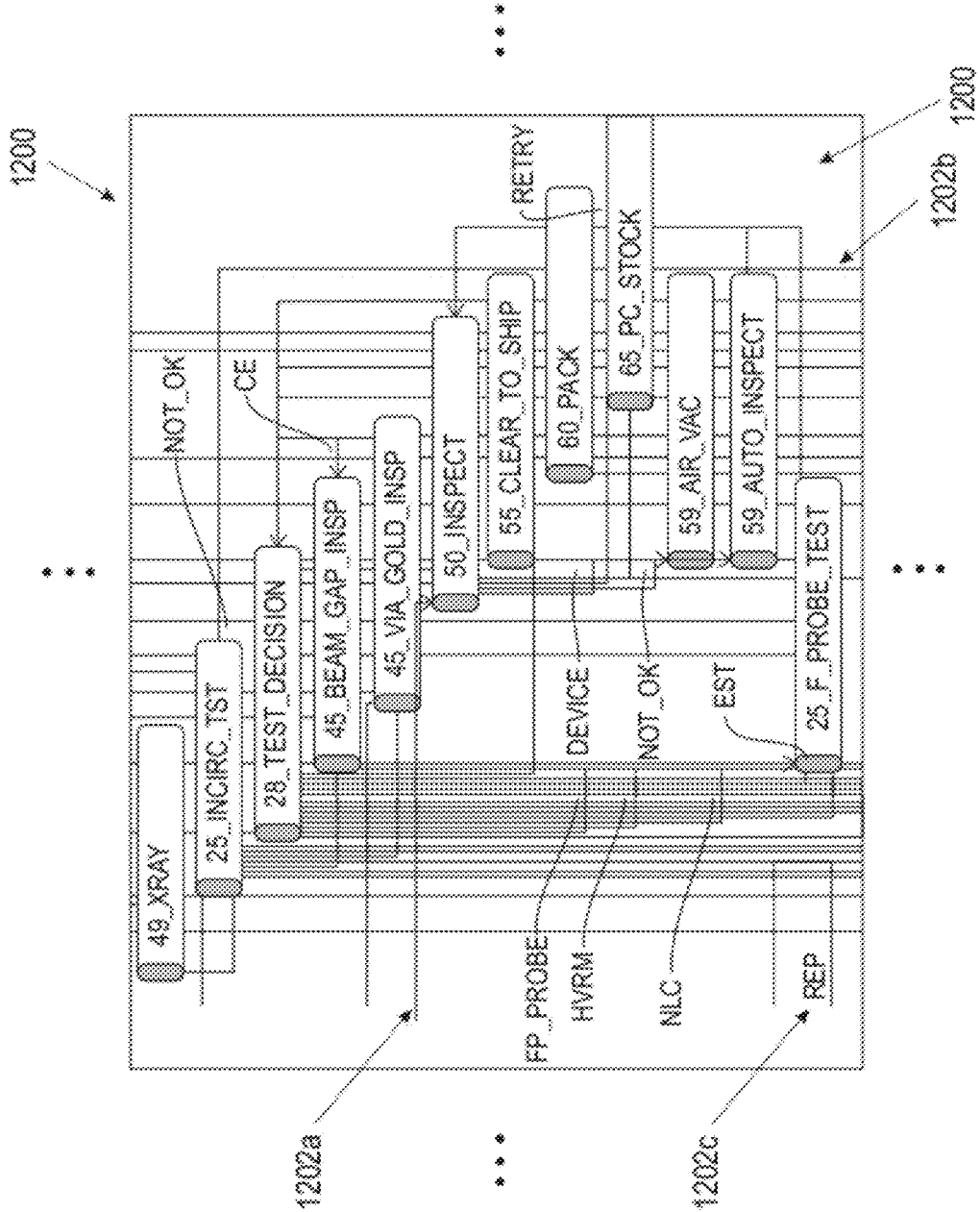
FIG. 12 is a complete progression diagram of a process in accordance with embodiments of this disclosure.

FIG. 12 is a complete progression diagram 1200 of a process in accordance with embodiments of this disclosure. In FIG. 12, only a part of the complete progression diagram 1200 is shown due the size of the sheet of paper relative to the size of the complete progression diagram. The complete progression diagram 1200 is automatically generated from data stored in a database. The complete progression diagram 1200 includes directional lines, such as 1202a, 1202b, and 1202c, linking nodes representing originating operations to nodes representing corresponding subsequent operations. The directional lines represent the outcomes of the originating operations. In FIG. 12, at least some of the directional lines unintelligibly overlap. It is difficult to understand where some of the directional line ends and continues. This kind of overlap is what some refer to as spaghetti. In the embodiments shown in both FIGS. 11 and 12, each node has the same geometric shape, in this case a rounded rectangle.

Figure 13:
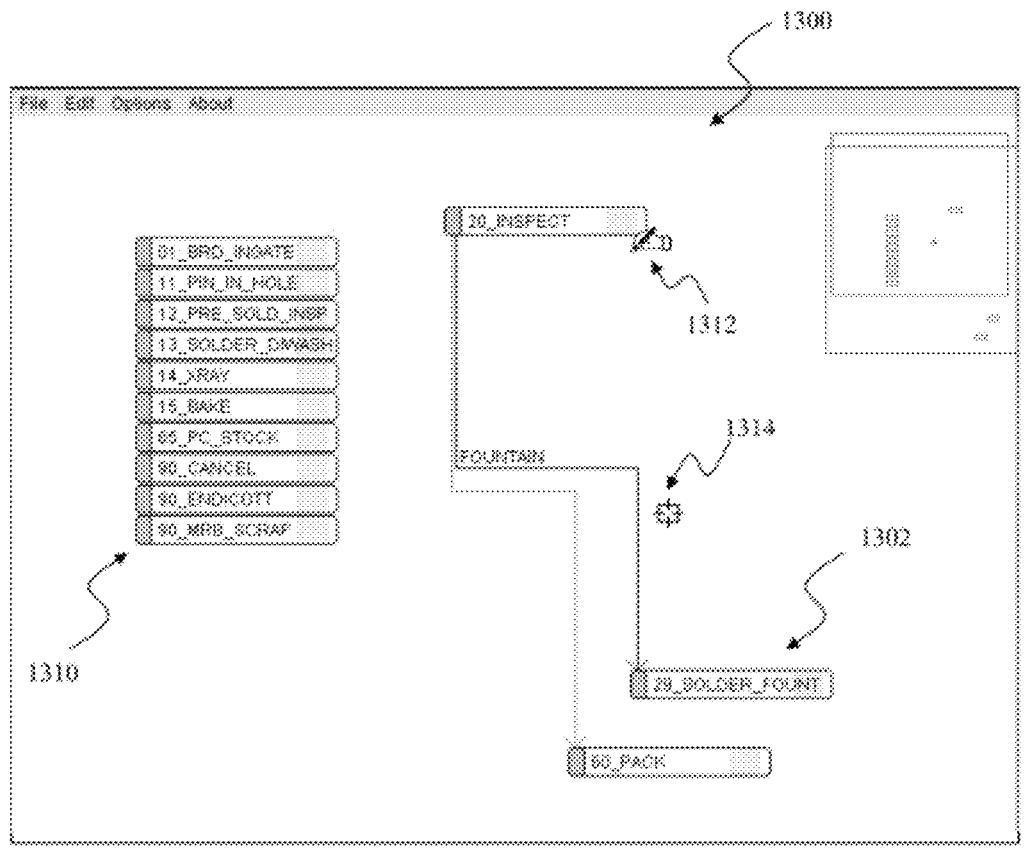
FIG. 13 is a view of a focus diagram in accordance with embodiments of the disclosure.

FIG. 13 is a view of a focus diagram 1300 generated in response to selecting a particular operation 20_INSPECT in the complete progression diagram 1100. This may have occurred in response to the selection of an operation at block 940 or 1020, for example. The focus diagram 1300 is a separate progression diagram from the complete progression diagram 1100. The focus diagram 1300 is not a zoomed-in magnification of the complete progression diagram 1100, but the focus diagram 1300 is coupled to the complete progression diagram 1100.

The focus diagram 1300 includes only those directional lines which represent outcomes of the particular operation which was selected, in this example, 20_INSPECT. Those directional lines link nodes representing the particular operation which was selected (here, 20_INSPECT) to nodes representing only those corresponding subsequent operations directly based on the outcomes of the particular operation (here, 29_SOLDER_FOUNT and 60_PACK). As can be understood with reference to FIG. 5, the focus diagram 1300 is consistent with operations and outcomes shown for 20_INSPECT in the operations table 500. In FIG. 13, nodes representing operations that immediately preceded the selected operation 20_INSPECT are not shown in the focus diagram 1300. Since a focus diagram is a progression diagram, it will more likely be used to convey a progression that occurs, e.g., the progression of a product being manufactured. Once an object undergoes a particular operation, an operator or manager of the process is more often concerned about what the next step for that object will be.

In an exemplary embodiment, the focus diagram is editable. Accordingly, a user may change the spatial relationship between nodes in the focus diagram 1300, e.g., by moving the node representing 29_SOLDER_FOUNT spatially closer to the node representing 20_INSPECT. Any directional lines connected to the moved node also moves to continue illustrating the functional relationship between the operation represented by the moved node and the operation (s) represented by the nodes connected to the moved node. In certain embodiments, such changes to the focus diagram may be saved, e.g., for a particular user logged into the system, so that the next time the same user views the focus diagram, the customized view is shown. Other users may, by default, continue to view the automatically generated version of the focus diagram. Because the focus diagram 1300 is a separate progression diagram from the complete progression diagram 1100, changing the spatial relationship in the focus diagram 1300 does not change the locations of those nodes in the complete progression diagram 1100.

The focus diagram may additionally or alternatively be editable by allowing a user to change the functional relationships between nodes, e.g., by adding or removing a directional line between two nodes. Because the focus diagram 1300 is coupled to the complete progression diagram 1100, changing the functional relationship between nodes in the focus diagram 1300 will change the relationship between those nodes in the complete progression diagram 1100. For example, adding a directional line between two nodes in the focus diagram will also add a directional line between the same two nodes in the corresponding complete progression diagram.

In FIG. 13, the view includes nodes 1310 representing non-linked operations of the process. In the embodiment shown, the non-linked operations of the process are operations of the process which are not linked to any other operation in the process as depicted in the present diagram, which in this case is the focus diagram 1300. In an exemplary embodiment, the non-linked operations of the process are operations of the process which are not linked to any other operation in the process as currently depicted by the complete progression diagram, e.g., the complete progression diagram 1100 or 1200, even when the presently viewed diagram is a focus diagram. In such an embodiment, the display of the complete progression diagram's non-linked operations aids in conveying to the user which operations should or could be part of the process, but is not currently part of the process. For example, the fact that 90_ENDICOTT is not currently part of the depicted progress may be more readily understood by viewing FIG. 11 or FIG. 13 than the table in FIG. 5, particular if the process is more complex, e.g., if the process is that of FIG. 12. Understanding which operations should or could be part of a process, but is not currently part of the process, may aid in troubleshooting the process and/or understanding available options for fixing the process.

In FIG. 13, the view includes a directional line drawing tool 1312 and a line deletion tool 1314, represented by a hand holding a pencil and a square with a cross-hair, respectively, for ease of understanding. It shall be appreciated that a directional line drawing tool and a line deletion tool in accordance with embodiments of this invention is not limited to such representations. Application of these tools in embodiments of this disclosure is described with reference to FIG. 14.

Figure 14:
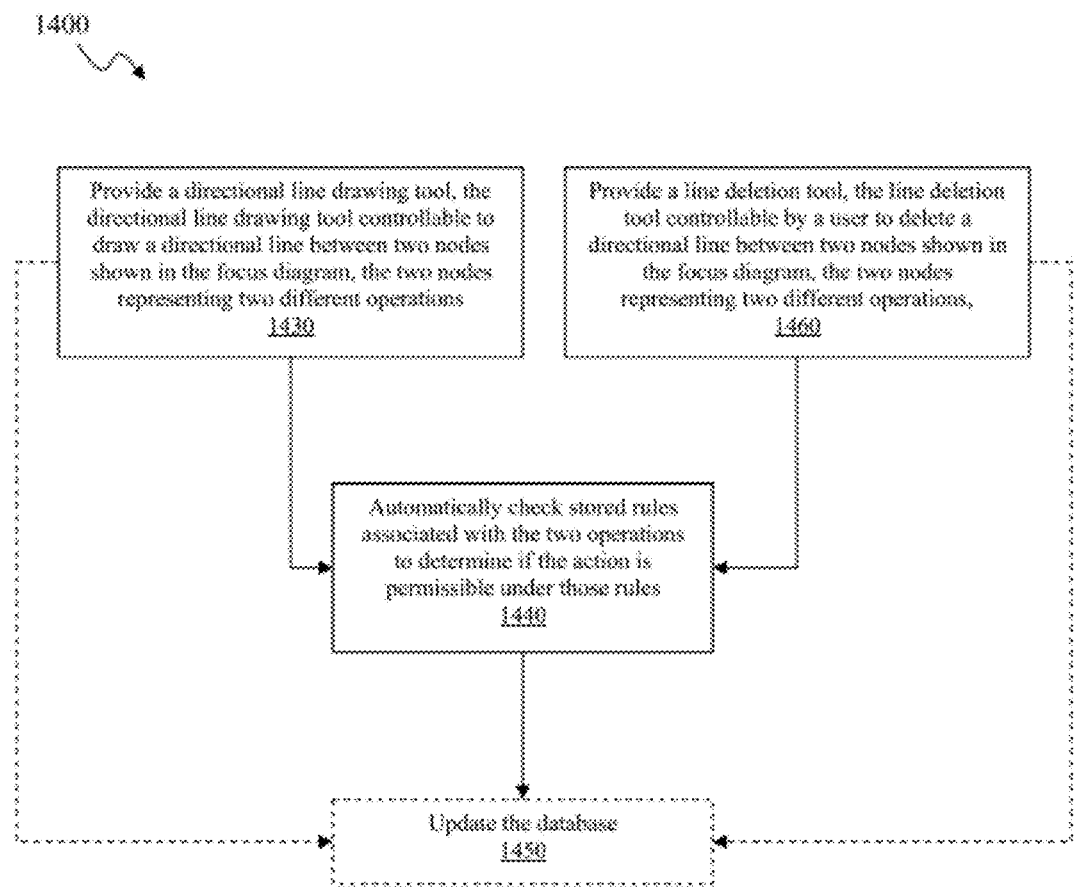
FIG. 14 is an illustration of a method in accordance with embodiments of the disclosure.

FIG. 14 is an illustration of a method 1400 in accordance with embodiments of the disclosure. The method 1400 includes, at block 1430, providing a directional line drawing tool (e.g., tool 1312). The directional line drawing tool is controllable by a user to draw a directional line between two nodes shown in a progression diagram, e.g., two nodes representing two different operations in a focus diagram. One of the two nodes may be a node representing a non-linked operation, such as a node representing 90_ENDICOTT, for example.

In response to drawing a directional line between the two nodes, at block 1440, the method includes automatically checking stored rules associated with the two operations to determine if the action (here, linking of the two operations) is permissible under those rules. The automatic checking may be performed by a system, e.g., the system 1900B described below, for example. The rules may be stored in the database 1940 shown in FIG. 19B, or the memory 54, the storage unit 60, or the storage unit 62 shown in FIG. 21, for example. In an exemplary embodiment, the automatic checking occurs in response to adding or deleting a directional line between the two nodes, but only after the user attempts to save the change. In one embodiment, the method 1400 includes, at block 1450, updating the database that stored the data from which the complete progression diagram was automatically generated, e.g., as part of saving the change to the focus diagram.

In one embodiment, the method 1400 also includes, at block 1460, providing a line deletion tool (e.g., the line deletion tool 1314). The line deletion tool is controllable by a user to delete a directional line between two nodes shown in the focus diagram, the two nodes representing two different operations. The two nodes may be node represent 20_INSPECT and 29_SOLDER_FOUNT, for example. In response to deleting of the directional line between the two nodes, the method 1400 includes, at block 1440, automatically checking stored rules associated with the two operations to determine if the action (here, terminating a relationship between the two operations) is permissible under those rules.

Figure 15:
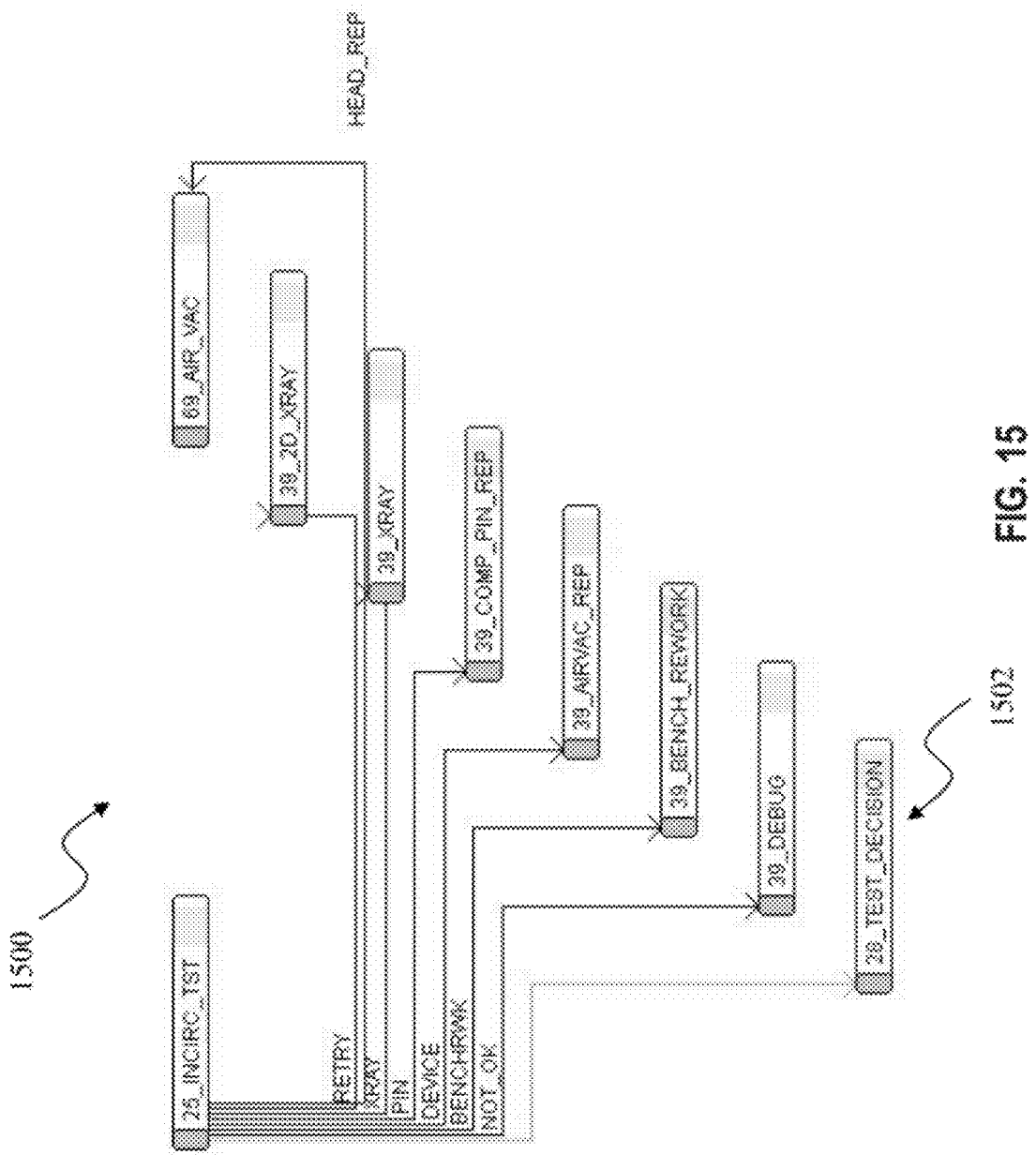
FIG. 15 is a view of a focus diagram in accordance with embodiments of the disclosure.

FIG. 15 is a view of a focus diagram 1500 generated in response to selecting a particular operation 25_INCIRC_TST in the complete progression diagram 1200, partially shown in FIG. 12. This generation may have occurred in response to the selection of an operation at block 940 or 1020, for example. In an exemplary embodiment, the view is automatically generated based on a user selection. In other embodiments, the focus diagram is pre-generated and the method includes retrieving the focus diagram from a storage device (e.g., the removable storage unit 60 or 62 shown in FIG. 21, for example).

The focus diagram 1500 is a separate progression diagram from the complete progression diagram 1200, but is coupled to the complete progression diagram 1200. Changing the spatial relationship between nodes in the focus diagram 1500, e.g., by moving the node representing 69_AIR_VAC spatially further from the node representing 25_INCIRC_TST, does not rearrange the locations of those nodes in the complete progression diagram 1200. However, changing the functional relationship between nodes in the focus diagram 1500, e.g., by removing the directional line between the node representing 25_INCIRC_TST and the node representing 69_AIR_VAC, will change that relationship between the nodes in the complete progression diagram 1200 as well. In one embodiment, the database that stores the data from which the complete progression diagram 1200 was automatically generated is also updated when a functional relationship is changed via the focus diagram. In FIG. 15, the 28_TEST_DECISION operation is represented by a node labeled 1502.

Figure 16:
FIG. 16 is a view of a focus diagram in accordance with embodiments of the disclosure.

FIG. 16 is a view of a focus diagram 1600 generated in response to selecting in the focus diagram 1500 the node label 1502. Accordingly, in use, a user may click through successive focus diagrams, which may facilitate a better understanding of the process. For example, a user may click on the node representing 25_INCIRC_TST in the complete progression diagram 1200 to view the focus diagram 1500. Then, a user may select the node representing 28_TEST_DECISION (labeled 1502) in the focus diagram 1500, and a new focus diagram 1600 is provided based on the 28_TEST_DECISION selection. It shall be appreciated that this is also applicable starting from a different progression diagram, e.g., the complete progression diagram 1100 or starting directly from a focus diagram rather than a complete progression diagram.

In FIG. 16, some of the directional lines overlap. However, in an embodiment in which the focus diagram is editable, a user can readily improve readability by changing the spatial location of some of the nodes shown in the focus diagram. Since the focus diagram is relatively simple (showing only those outcomes from a single node), such a task is not unviably time-consuming. In certain embodiments, such a user can elect to save those changes to the focus diagram.

Figure 17:
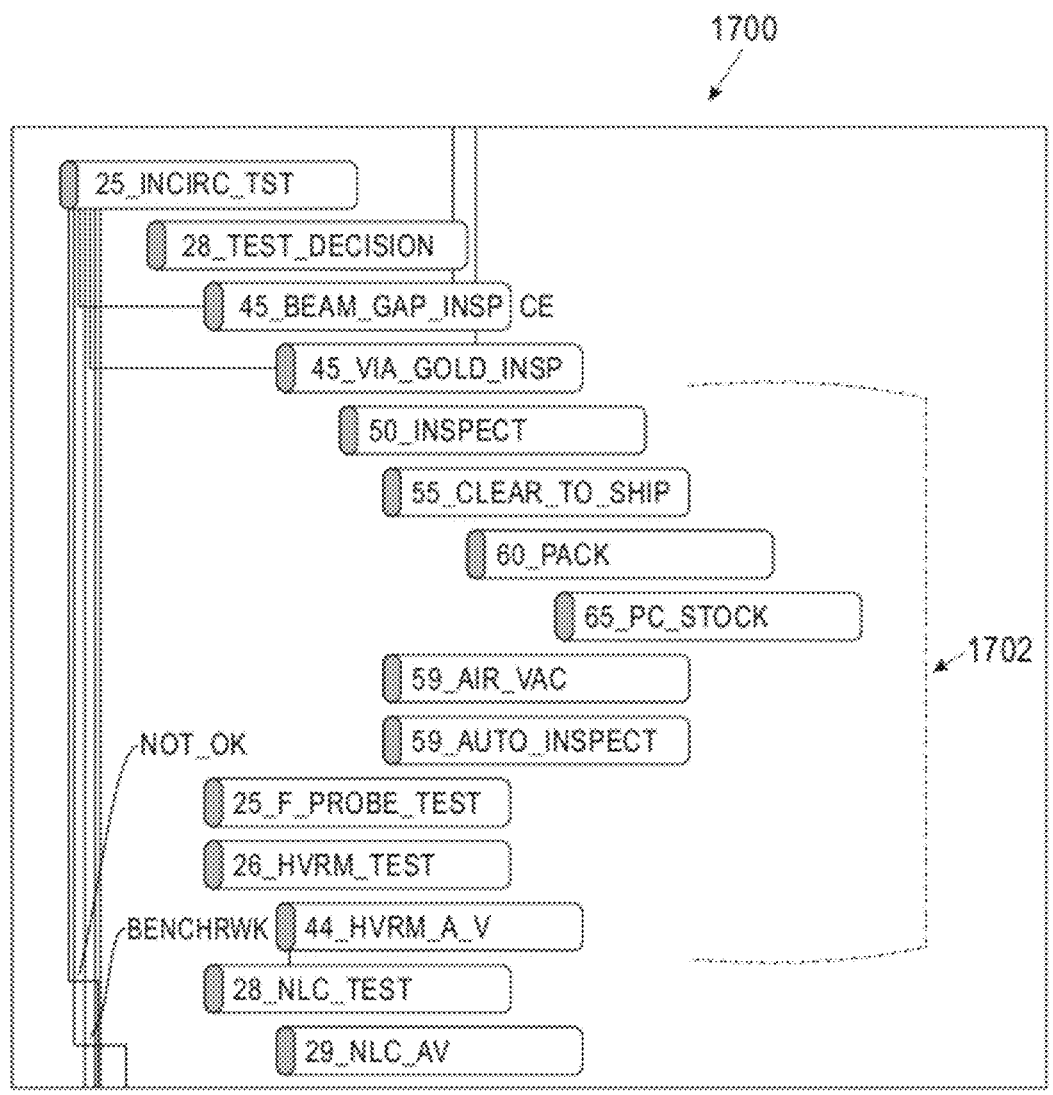
FIG. 17 is a complete progression diagram of the process also shown in FIG. 12.

FIG. 17 is a complete progression diagram 1700 of the process also shown in FIG. 12. Similar to FIG. 12, FIG. 17 shows only a part of the actual complete progression diagram. In the complete progression diagram 1700, the node representing 25_INCIRC_TST is selected. However, instead of toggling to a focus diagram, a tool (e.g., tool 1810A in FIG. 18E) was selected to hide all directional lines in the view except those lines connecting the selected node (here, 25_INCIRC_TST) to its directly subsequent operations. This view may provide insight for certain operations without generating a completely separate diagram (the focus diagram). However, as can be understood from FIG. 17, for certain selected operations, this view may include directional lines that overlap and/or extend beyond the immediate display. This is because this view is not a focus diagram, but the complete progression diagram with many of the directional lines hidden; therefore, the nodes in the process which are not directly connected to the selected node are still shown, e.g., the nodes labeled 1702 in FIG. 17.

In an exemplary embodiment, in a complete progression diagram, the nodes representing corresponding subsequent operations are visually shifted in a consistent direction away from nodes representing the corresponding originating operations. The consistent direction of the visually shifted nodes conveys to the user a progressive route between the operations of the process. In an exemplary embodiment, the consistent direction is right and down, such as is the case with FIG. 17. In FIG. 17, one can see that operation 65_PC_STOCK occurs later in the process than 49_BENCH_REWORK since 65_PC_STOCK is shifted to the right and down from 49_BENCH_REWORK. In other embodiments, the consistent direction may differ. For example, it may be down and to the left.

In one embodiment, a directional line hiding tool (e.g., tool 1810B in FIG. 18E) is provided. The directional line hiding tool is controllable (e.g., by a user) to hide all directional lines in the complete progression diagram, e.g., including the directional lines shown in FIG. 17. In FIG. 17, even when all directional lines in the complete progression diagram are hidden, the consistent direction of the visually shifted nodes conveys to the user a major route between operations of the process. This major route may be the progression route from 49_BENCH_REWORK to 65_PC_STOCK, for example.

Figure 18A:
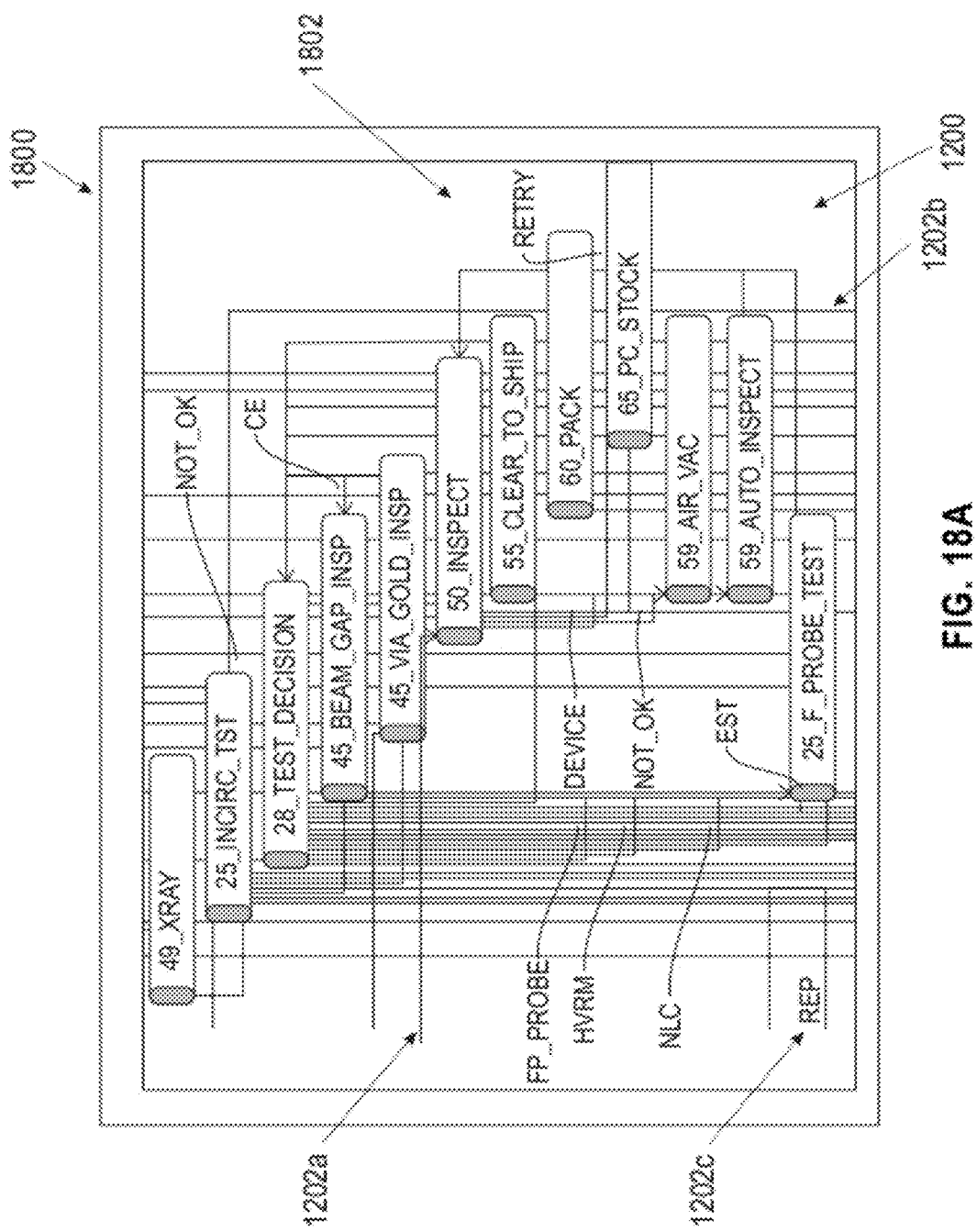
FIGS. 18A-18E are illustrations of a display device providing views in accordance with embodiments of this disclosure.
Figure 18B:
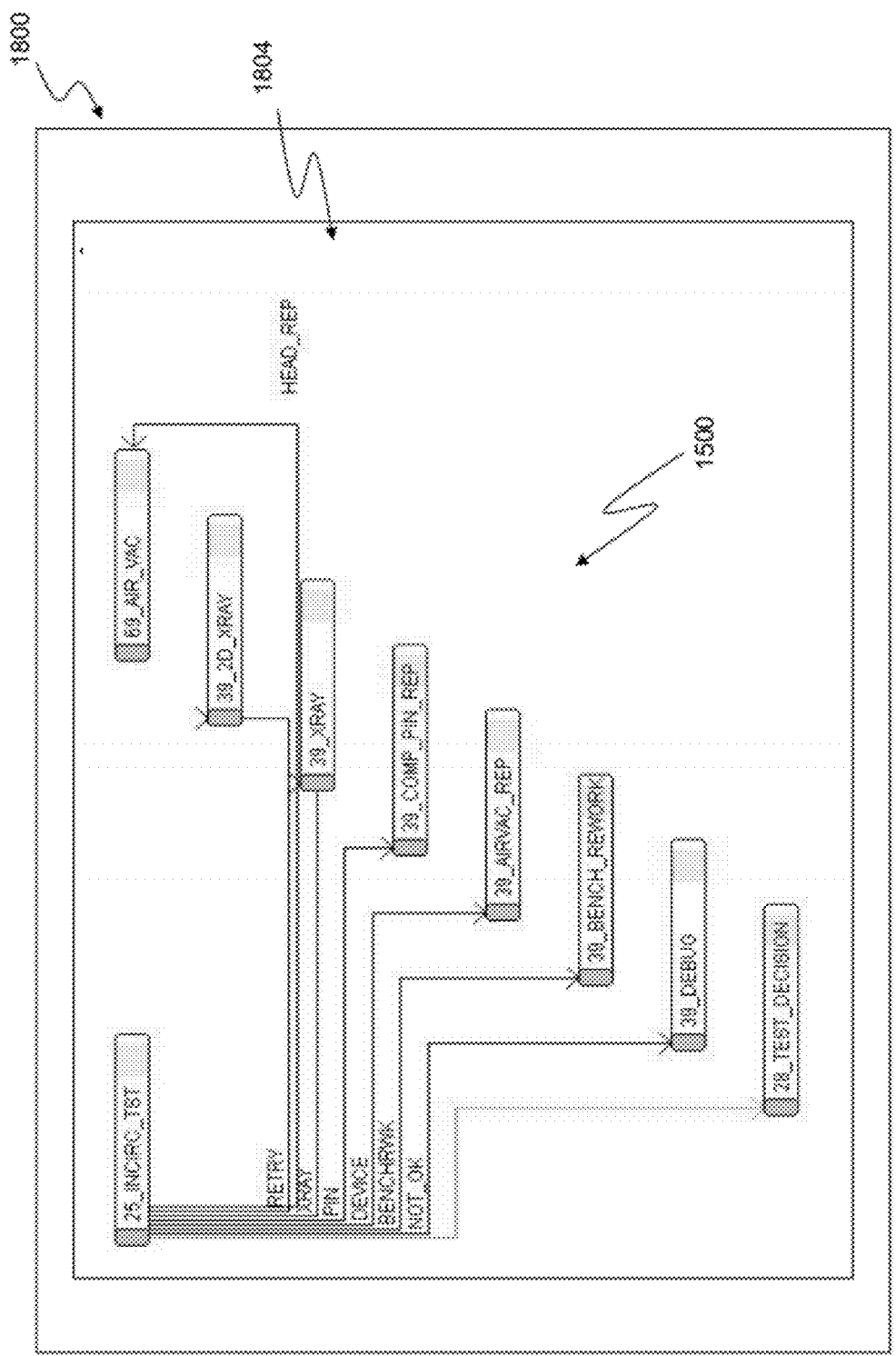
Figure 18C:
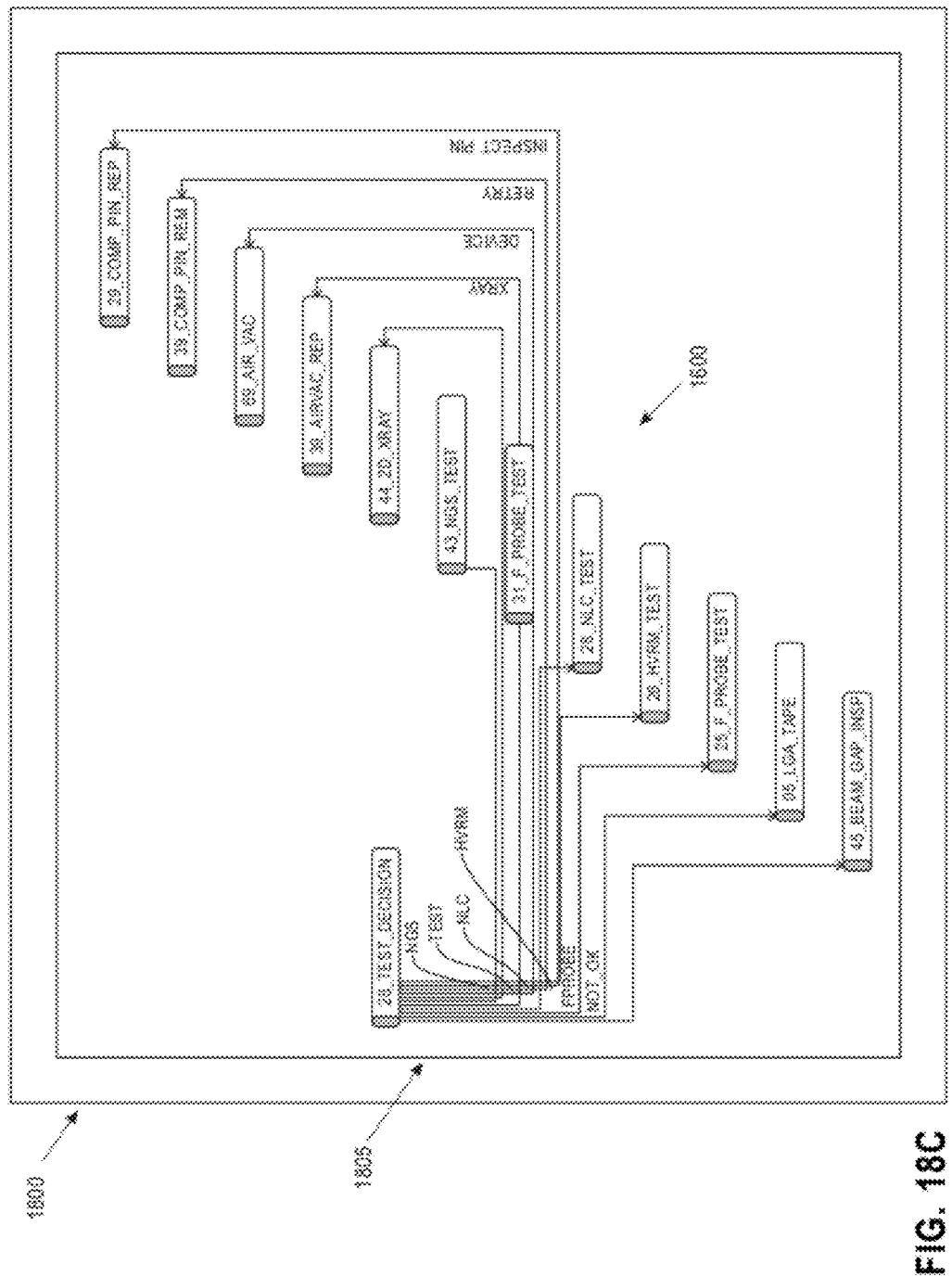

FIGS. 18A-18E are illustrations of a display device 1800 providing views in accordance with embodiments of this disclosure. In FIGS. 18A-18E, the display device 1800 is the same device. In FIG. 18A, the display device 1800 provides a view 1802 that includes a complete progression diagram which, in this example, is the complete progression diagram 1200 of FIG. 12. In FIG. 18B, the display device 1800 provides a view 1804 that includes a focus diagram; in this example, the focus diagram is focus diagram 1500 of FIG. 15. In FIG. 18C, the display device 1800 provides a view 1805 that includes another focus diagram; in this example, the focus diagram is focus diagram 1600 of FIG. 16.

Figure 18D:
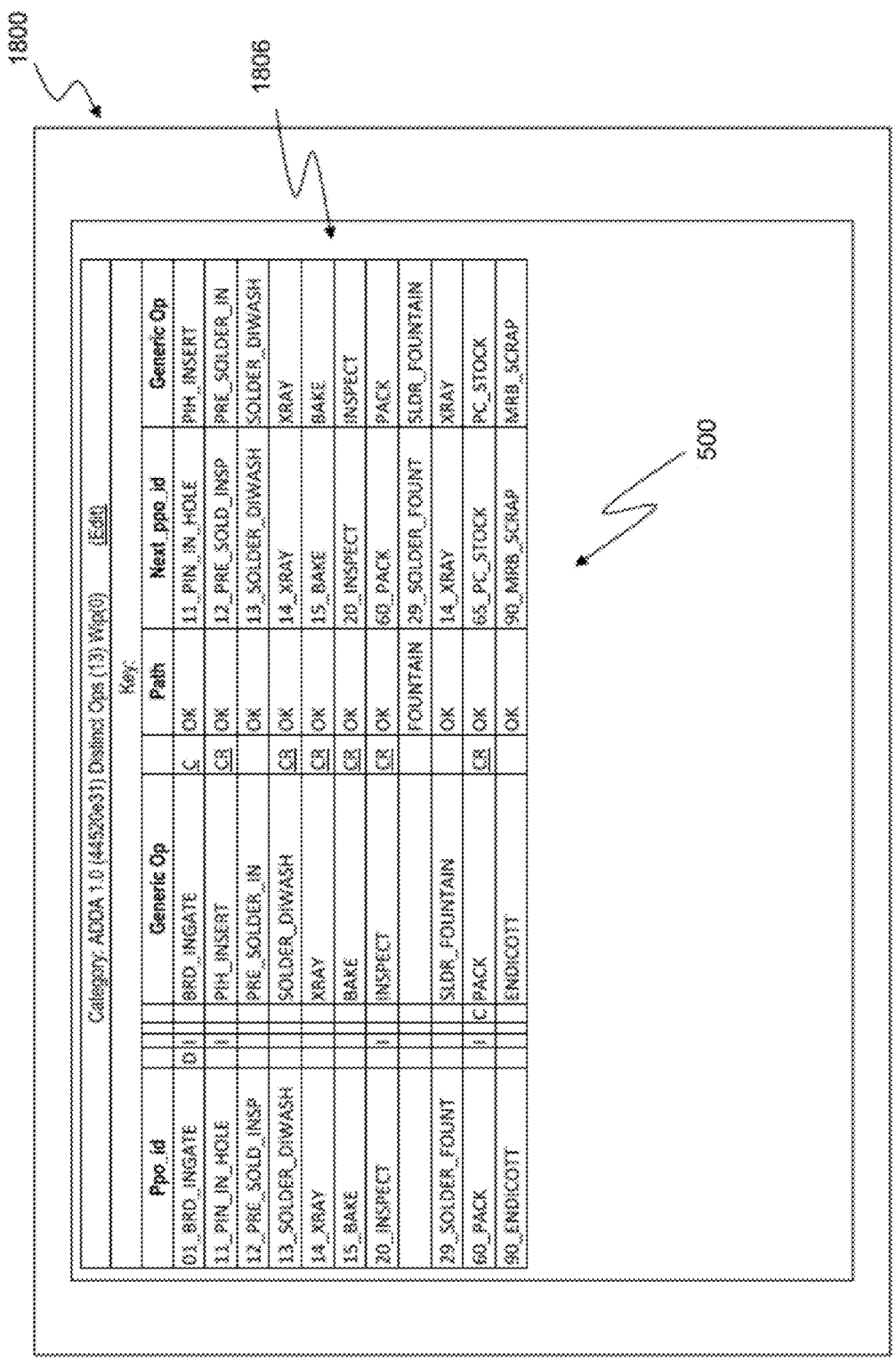

In FIG. 18D, the display device 1800 provides a view 1806 that includes an operations table which, in this example, is the operations table 500 of FIG. 5. This view 1806 may be generating after accessing a database to retrieve data, e.g., data about the operations and/or data relating to one more facilities or locations in which the process is being performed, for example.

Figure 18E:
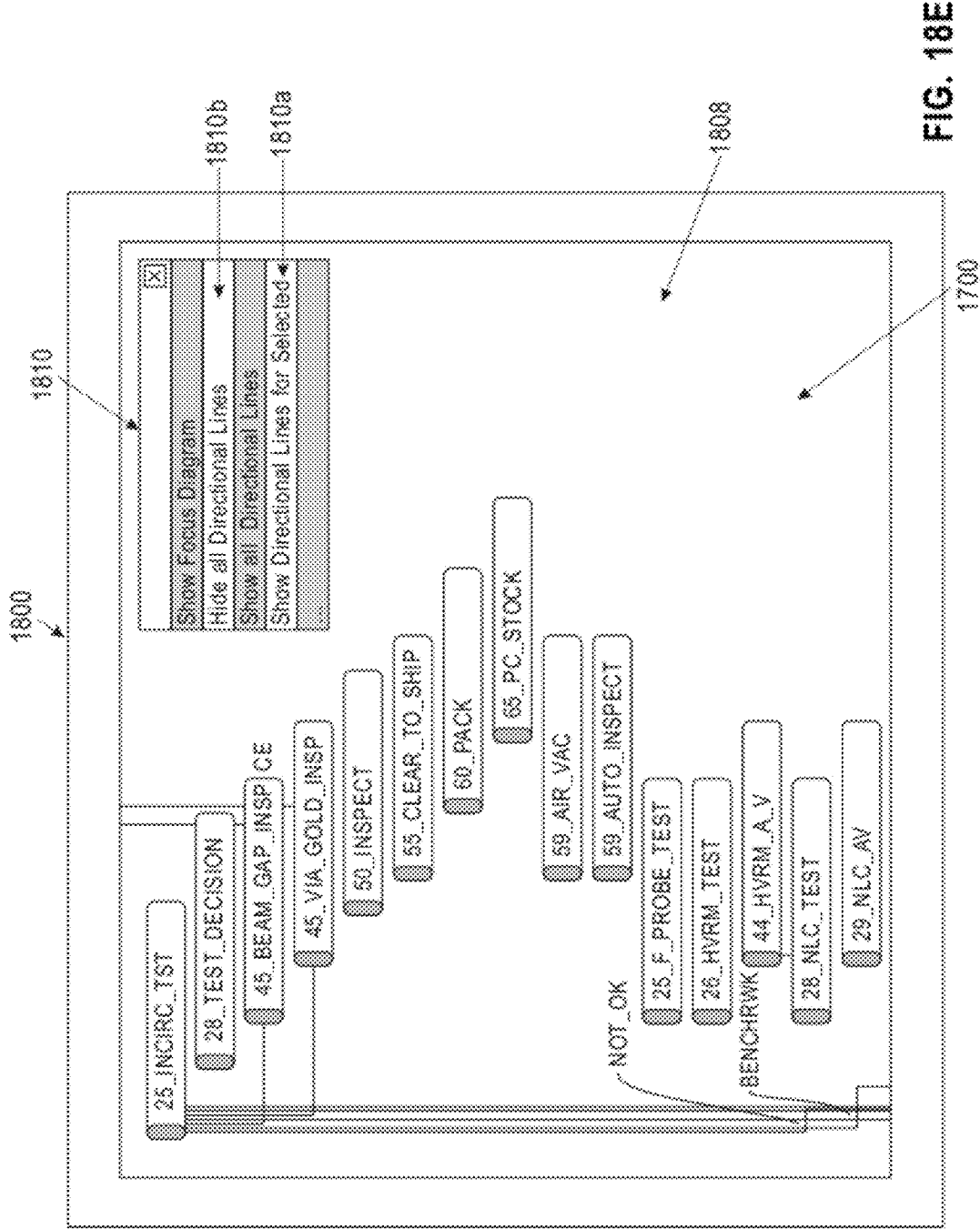

In FIG. 18E, the display device 1800 provides a view 1808 that includes a complete progression diagram with some directional lines hidden; in this example, the complete progression diagram is the complete progression diagram 1700 of FIG. 17. FIG. 18E also shows a tool 1810. The tool 1810 may be, for example, a pop-up box with items individually selectable by a user, e.g., via a mouse or a touch of a finger if the display device includes or is part of a touch-screen. The tool 1810 includes a selective directional line tool 1810A. The selective directional line tool 1810A is controllable by a user to hide all directional lines in the view except those lines connecting the selected node to its directly subsequent operations. This may be better understood by referring back to FIG. 17. The tool 1810 also includes a directional line hiding tool 1810B. The directional line hiding tool 1810B is controllable by a user to hide all directional lines in the complete progression diagram.

Figure 19A:
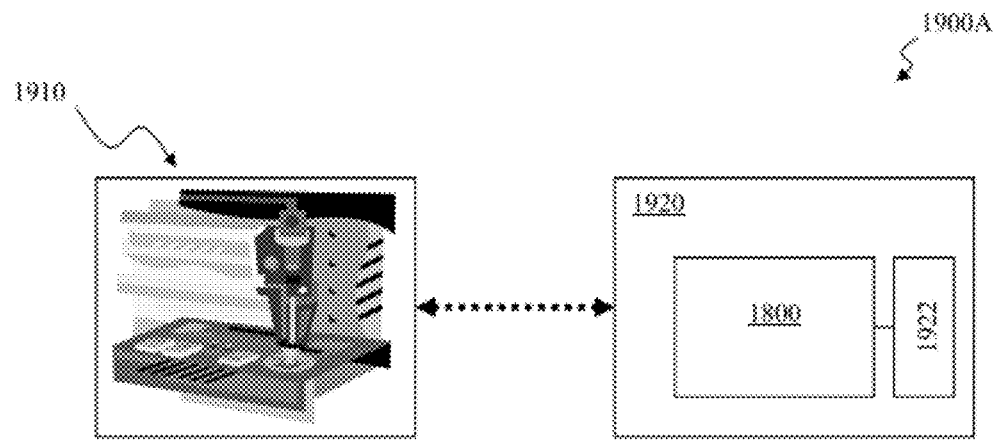
FIG. 19A is an illustration of a system in accordance with embodiments of this disclosure.

FIG. 19A is an illustration of a system 1900A in accordance with embodiments of this disclosure. In FIG. 19A, the system 1900A is a manufacturing process management system. However, it shall be appreciated that embodiments of this disclosure are also applicable to systems unrelated to manufacturing. In FIG. 19A, the system 1900A includes a manufacturing production facility 1910 and a client device 1920. The manufacturing production facility 1910 may be, for example, a building or site having equipment used in the manufacturing a product, such as a computer or a semiconductor chipset.

The client device 1920 is operatively coupled to the manufacturing production facility 1910. The client device 1920 may be, for example, a desktop computer, a workstation, a laptop, a portable electronic reader, or a smart phone. The client device 1920 includes the display device 1800 and a user input tool 1922. The user input tool 1922 may be a mouse, keyboard, or, if the display device is a touch-screen, the components of the display device that enables it receive user input, for example.

The client device 1920 is configured to render on the display 1800 at least two automatic graphical renderings of a process. In this case, the two graphical renderings are of the manufacturing process being undertaken at the manufacturing production facility 1910, e.g., a view of a complete progression diagram (e.g., the view 1802) and a view of a focus diagram (e.g., the view 1804). The view of the focus diagram may be generated based on a selection, e.g., via the user input tool 1922, of a particular operation in the complete progression diagram.

In certain embodiments, the client device is also configured to render on the display other views, e.g., a view of another focus diagram, such as the view 1805 in response to selecting an operation in the focus diagram 1500 via the view 1804, the view 1806 containing the operations table 500, and/or the view 1808 of a complete progression diagram with some directional lines hidden or with all directional lines hidden.

Figure 19B:
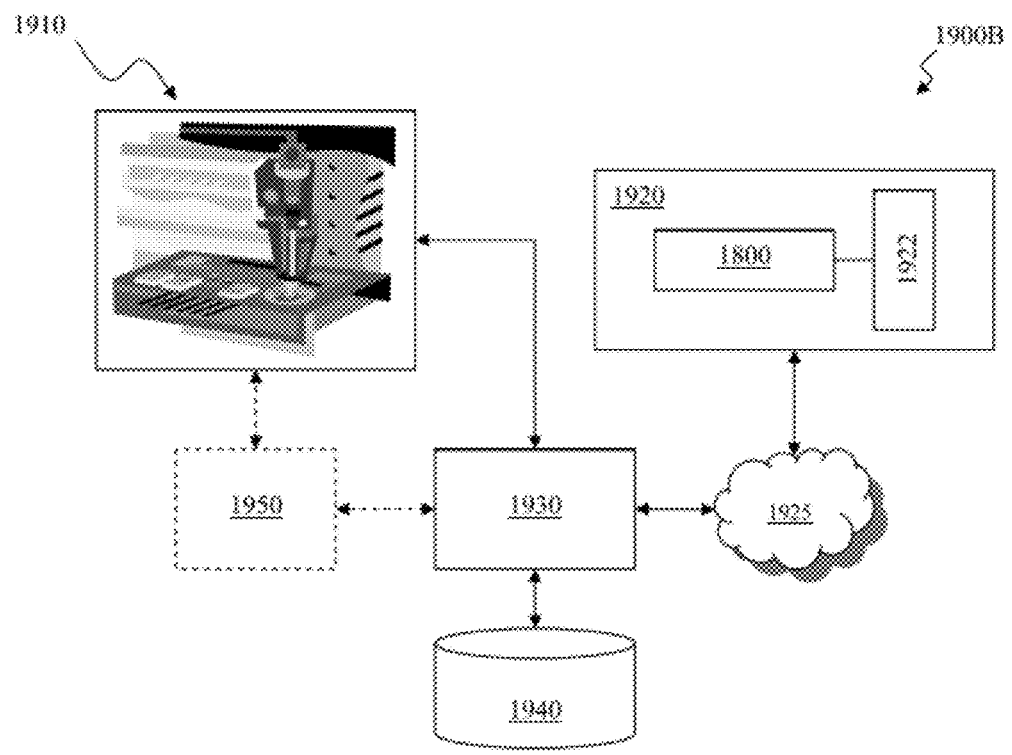
FIG. 19B is an illustration of a system in accordance with embodiments of this disclosure.

FIG. 19B is an illustration of a system 1900B in accordance with embodiments of this disclosure. FIG. 19B shows an exemplary embodiment of the client device 1920 operatively coupled to the manufacturing production facility 1910. In FIG. 19B, the system 1900B includes the manufacturing production facility 1910, the client device 1920, a server 1930, a database 1940, and a network 1925. In one embodiment, the system 1900B also includes a production line object tracking system 1950.

The client device 1920 is coupled to the server 1930 via the network 1925. The network 1925 may be, for example, an intranet. In one embodiment, the network is a public telecommunications infrastructure, e.g., the Internet or a wireless or mobile network, and the client device 1920 communicates with the server 1930 via the infrastructure using a secure connection, e.g., by tunneling through the infrastructure using virtual private network (VPN) technology.

The server 1930 is coupled to the database 1940. In an exemplary embodiment, the database 1940 is a relational database, e.g., an IBM® DB2® database. In this example, the database 1940 stores data relating to the manufacturing production facility 1910. In one embodiment, the database 1940 stores data from which an operations table is generated. The server 1930 is also coupled to the manufacturing production facility 1910. The server may be coupled to the manufacturing production facility via a network similar to or the same as the network 1925, for example. In one embodiment, the server 1930 is the inside the manufacturing production facility 1910.

In one embodiment, the production line object tracking system 1950 is communicatively coupled to the server 1930. For example, the production line object tracking system 1950 may be connected to the manufacturing production facility 1910 and communicate with the server 1930 via the manufacturing production facility's connection with the server. The production line object tracking system 1950 may also be directly connected to the server 1930. In an exemplary embodiment, the production line object tracking system 1950 is the inside the manufacturing production facility

1910. The production line object tracking system 1950 tracks objects moving through the live production line in the manufacturing production facility 1910. For example, if the live production line includes an assembly line manned by people, the production line object tracking system may include station check points. A person manning a specific station (at which one or more operation of the process occurs) may record, e.g., via the server 1930 or a different server, when an object enters and leaves that specific station. In one embodiment, the production line object tracking system uses radio frequency identification (RFID) technology to help track objects.

Figure 20:
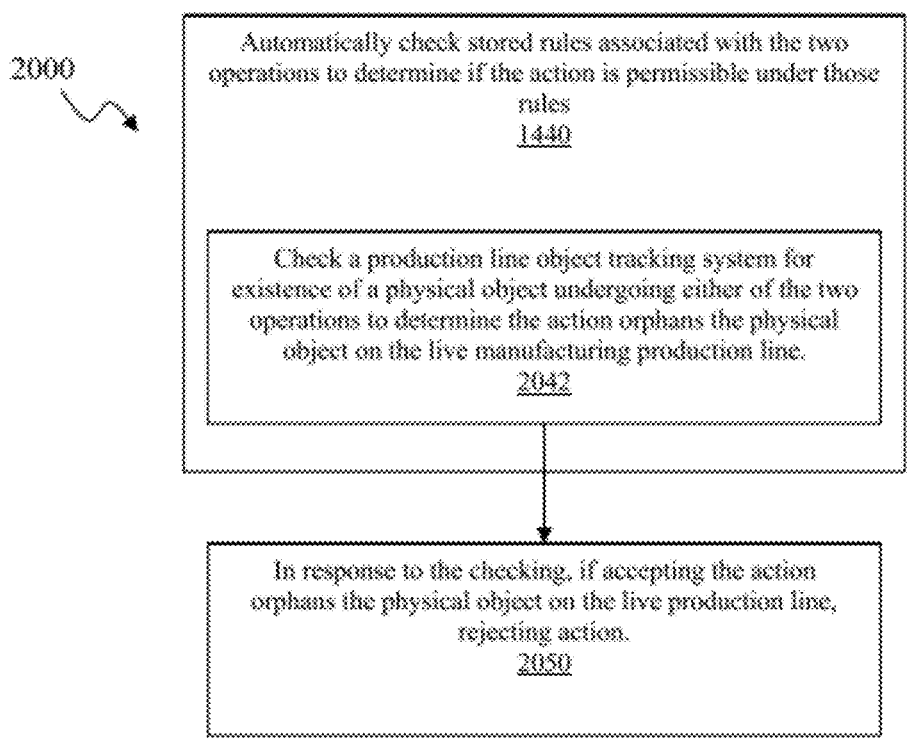
FIG. 20 is an illustration of a method in accordance with embodiments of this disclosure.

FIG. 20 is an illustration of a method 2000 in accordance with embodiments of this disclosure. The method 2000 begins with the block 1440 from FIG. 14. For example, with reference to FIG. 13, a user may use the tool 1314 to delete the line from 20_INSPECT to 29_SOLDER_FOUNT. At 1440, the system (e.g., 1900B), automatically checks stored rules associated with the two operations to determine if the action is permissible under those rules. In this case, the action is deleting a directional line between two nodes, which in effect will terminate that relationship between the two operations represented by the nodes. In an exemplary embodiment, the process relates to a live manufacturing production line. In such an embodiment, the checking may include, at block 2042, checking a production line object tracking system (e.g., tracking system 1950) for the existence of a physical object undergoing either of the two operations to determine if the action orphans the physical object on the live manufacturing production line. For example, the server 1950 may send a request to the production line object tracking system 1950 to determine if any physical object is undergoing 20_INSPECT. If an object is undergoing to 20_INSPECT, deleting the directional line may orphan that physical object on the live manufacturing production line. This orphaning may occur, for example, if that physical object has the potential of not passing that inspection operation and may not be in a state to be sent onward to 60_PACK. This checking may be particularly relevant if the individuals managing the process, and attempting to make the change, are distant from live production line, e.g., located in another city or state.

At block 2050, in response to the checking, if accepting the action orphans the physical object on the live production line, the system rejects action. For example, if deleting of the directional line orphans the physical object on the live production line, the server 1930 rejects deletion of the directional line. This rejection result in include, for example, a pop-up message describing the issue to the user who attempted to delete the line, and automatically redrawing the line between the nodes.

Accordingly, in certain embodiments, a client device, e.g., 1920, is configured to transmit a request to the server in response to receiving instructions to add or delete a directional line between two nodes depicted in a progression diagram, e.g., the focus diagram 1500. The instructions may be received via the user input tool (e.g., 1922), for example. In an exemplary embodiment, the request to the server includes a request for the server to communicate with a tracking system to determine whether a physical object is undergoing either of the two operations and determine whether linking of the two operations orphans the physical object in the live production line.

CONCLUSION

Accordingly, automatic graphical rendering of processes is disclosed. As will be appreciated, aspects of this disclosure are particularly applicable to processes that are sufficiently complex that a detailed ANSI/ISO flowchart of such a process would not be manually created, by hand or with the aid of templates in software such as Microsoft® Visio®, because manual creation would be too time consuming to be commercially viable or too unreadable to be useful.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the illustrations and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the illustrations and/or block diagram block or blocks.

Figure 21:
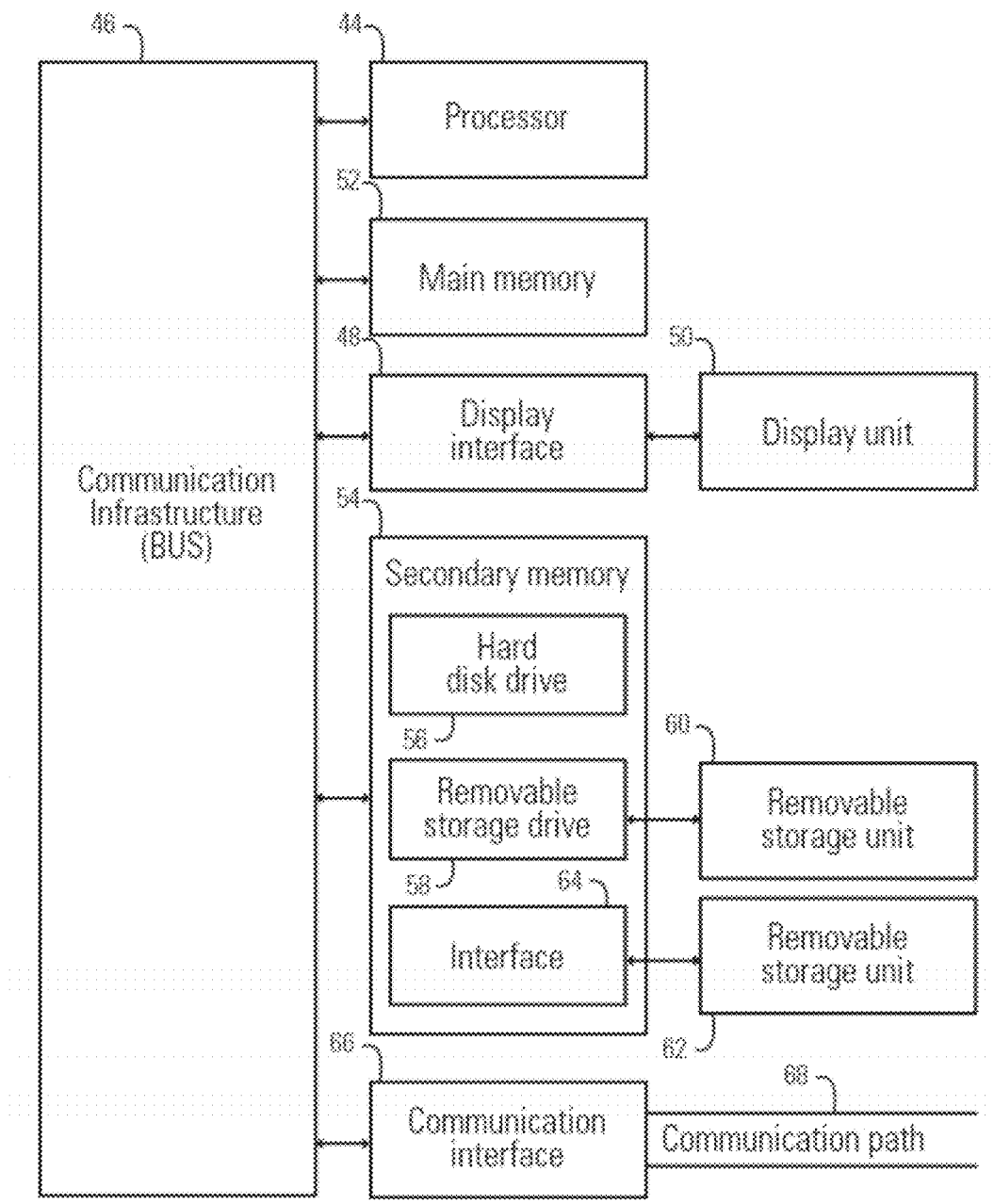
FIG. 21 is a high level block diagram showing an information processing system useful for implementing embodiments of this disclosure.

FIG. 21 is a high level block diagram showing an information processing system useful for implementing embodiments of this disclosure. The processing system may be or be part of a server 1930 or client device 1920, for example. The computer system includes one or more processors, such as processor 44. The processor 44 is connected to a communication infrastructure 46 (e.g., a communications bus, cross-over bar, or network). Various embodiments are described in terms of this exemplary computer system. After reading this description, it will become apparent to a person of ordinary skill in the relevant art(s) how to implement embodiments of this disclosure using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present disclosure as discussed herein. In particular, the computer programs, when executed, enable the processor 44 to perform the features of the computer system. Accordingly, such computer programs represent controllers of the computer system.

The illustrations and block diagrams in the Figures illustrate the architecture, functionality, and operation of possible implementations of systems, methods and computer program products according to various embodiments of the present disclosure. In this regard, each block in the illustrations or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or illustration, and combinations of blocks in the block diagrams and/or illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method," "an embodiment," "one embodiment," or "an exemplary embodiment" throughout are not intended to mean the same method or same embodiment, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. In a graphical user interface, a method for rendering on a display device operations of a process and routes between said operations, the method comprising:
   providing a first view, the first view comprising a complete progression diagram automatically generated from data stored in a database, wherein the complete progression diagram includes directional lines linking nodes representing originating operations to nodes representing corresponding subsequent operations, wherein the directional lines represent the outcomes of the originating operations, and wherein at least some of the directional lines overlap; and
   in response to a user selection of a particular operation in the complete progression diagram, toggling to a second view, the second view automatically generated based on the user selection and comprising a focus diagram, wherein the focus diagram is a separate progression diagram including only those directional lines which represent outcomes of the particular operation, wherein said only those directional lines link nodes representing the particular operation to nodes representing only those corresponding subsequent operations directly based on said outcomes of the particular operation.

2. The method of claim 1, wherein the second view further comprises a node representing a non-linked operation of the process, wherein the non-linked operations of the process is an operation of the process which is not linked to any other operation in the process as currently depicted by the complete progression diagram.

3. The method of claim 1, further comprising:
   providing a directional line drawing tool, the directional line drawing tool controllable by a user to draw a directional line between two nodes shown in the focus diagram, the two nodes representing two different operations.

4. The method of claim 3, further comprising,
   in response to drawing of the directional line between the two nodes, automatically checking stored rules associated with the two operations to determine if linking the two operations is permissible under said rules.

5. The method of claim 3, further comprising,
   in response to drawing of the directional line between the two nodes, updating the database.

6. The method of claim 1, further comprising:
   providing a line deletion tool, the line deletion tool controllable by a user to delete a directional line between two nodes shown in the focus diagram, the two nodes representing two different operations.

7. The method of claim 6, further comprising,
   in response to deleting of the directional line between the two nodes, automatically checking stored rules associated with the two operations to determine if terminating a relationship between the two operations is permissible under said rules.

8. The method of claim 7, wherein the process relates to a live manufacturing production line.

9. The method of claim 7, wherein automatically checking stored rules associated with the two operations to determine if terminating the relationship between the two operations is permissible under said rules comprises:
   checking a production line object tracking system for existence of a physical object undergoing either of said two operations to determine whether deleting of the directional line orphans said physical object on the live manufacturing production line.

10. The method of claim 9, further comprising:
    in response to the checking, if deleting of the directional line orphans the physical object on the live production line, rejecting the deleting of the directional line.

11. The method of claim 1, further comprising:
    accessing the database; and
    generating a third view based on the data stored in the database, the third view comprising an operations table, the operations table comprising a first column identifying the originating operations, a second column identifying the outcomes of the originating operations, and a third column identifying the subsequent operations based on said outcomes.

12. The method of claim 1, wherein, in the complete progression diagram, the nodes representing corresponding subsequent operations are visually shifted in a consistent direction away from the nodes representing the corresponding originating operations.

13. The method of claim 12, wherein the consistent direction is right and down.

14. The method of claim 12, further comprising:
    providing a directional line hiding tool, wherein the directional line hiding tool is controllable by a user to hide all directional lines in the complete progression diagram, wherein when all directional lines in the complete progression diagram are hidden, the consistent direction of the visually shifted nodes conveys to the user a major route between the operations of the process.

15. The method of claim 1, further comprising:
    in response to a second user selection, the second user selection being a particular operation in the focus diagram, toggling to a third view, the third view automatically generated based on the second user selection and comprising a second focus diagram.

16. A method for displaying operations of a process, the method comprising:
    accessing an operations table, wherein the operations table comprising a first column identifying originating operations, a second column identifying outcomes of the originating operations, and a third column identifying subsequent operations based on said outcomes;
    converting, via an automated process, the operations table into a complete progression diagram, wherein the complete progression diagram depicts progressive routes through the operations by placing nodes representing later operations visually shifted in a consistent direction away from nodes representing earlier operations, and wherein the complete progression diagram depicts paths between the operations using directional lines connecting nodes representing originating operations to nodes representing corresponding subsequent operations, the directional lines representing the outcomes of the operating operations;

transmitting the complete progression diagram to a display device for display, wherein dimensions of the complete progression diagram relative to dimensions of the display device are such that at least some of the directional lines overlap; and in response to a user selecting an operation depicted in the complete progression diagram, causing the display device to display a focus diagram, wherein the focus diagram is a separate progression diagram depicting the selected operation, only those routes connecting the selected operation to immediate subsequent operations; and only those immediate subsequent operations.

17. The method of claim 16, wherein each node has the same geometric shape.

18. The method of claim 16, wherein the focus diagram is generated in response to the user selecting the operation.

19. The method of claim 16, wherein the focus diagram is pre-generated and the method further comprises retrieving the focus diagram from a storage device.

20. The method of claim 16, further comprising:
accessing data stored in a relational database; and
generating the operations table based on data stored in the relational database.

* * * * *